US009883176B2

(12) United States Patent
Usukura et al.

(10) Patent No.: US 9,883,176 B2
(45) Date of Patent: Jan. 30, 2018

(54) DISPLAY DEVICE

(71) Applicant: Panasonic Intellectual Property Corporation of America, Torrance, CA (US)

(72) Inventors: Tohru Usukura, Osaka (JP); Tatsumi Watanabe, Osaka (JP); Ken Mashitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 628 days.

(21) Appl. No.: 14/366,877

(22) PCT Filed: Dec. 20, 2012

(86) PCT No.: PCT/JP2012/008172
§ 371 (c)(1),
(2) Date: Jun. 19, 2014

(87) PCT Pub. No.: WO2013/094211
PCT Pub. Date: Jun. 27, 2013

(65) Prior Publication Data
US 2014/0313298 A1 Oct. 23, 2014

(30) Foreign Application Priority Data
Dec. 21, 2011 (JP) .................. 2011-280395

(51) Int. Cl.
*H04N 13/04* (2006.01)
*G03B 35/24* (2006.01)
(Continued)

(52) U.S. Cl.
CPC ....... *H04N 13/047* (2013.01); *G02B 27/0093* (2013.01); *G02B 27/2214* (2013.01);
(Continued)

(58) Field of Classification Search
CPC .................. G02B 27/2214; G02B 27/0093; G03B 35/24; H04N 13/0409; H04N 13/0415;
(Continued)

(56) References Cited

U.S. PATENT DOCUMENTS

2007/0188667 A1\* 8/2007 Schwerdtner ........ G02B 27/225
349/15
2007/0247590 A1\* 10/2007 Schwerdtner ...... H04N 13/0404
353/7
(Continued)

FOREIGN PATENT DOCUMENTS

| CN | 101461251 | 6/2009 |
|---|---|---|
| CN | 101790104 | 7/2010 |

(Continued)

OTHER PUBLICATIONS

Office Action dated Oct. 9, 2015 in corresponding Chinese Patent Application No. 201280063344.6 (English Translation).
(Continued)

*Primary Examiner* — Gelek W Topgyal
(74) *Attorney, Agent, or Firm* — Wenderoth, Lind & Ponack, L.L.P.

(57) ABSTRACT

A video display device (10) comprises a display unit (13) that includes a display surface emitting video light for displaying a composite image of a first image and a second image different from the first image, a parallax barrier (11) that separates the video light into first video light representing the first image and second video light representing the second image, a detection unit (12) that detects a position of an observer looking at the composite image, and a control unit (15) that controls a direction of the composite image in accordance with the position of the observer detected by the detection unit (12).

6 Claims, 17 Drawing Sheets

(51) Int. Cl.
*G02B 27/22* (2006.01)
*G02B 27/00* (2006.01)

(52) U.S. Cl.
CPC ......... *G03B 35/24* (2013.01); *H04N 13/0409* (2013.01); *H04N 13/0415* (2013.01); *H04N 13/0422* (2013.01); *H04N 13/0468* (2013.01); *H04N 13/0484* (2013.01); *H04N 13/0497* (2013.01)

(58) Field of Classification Search
CPC ........... H04N 13/0422; H04N 13/0468; H04N 13/047; H04N 13/0484; H04N 13/0497
See application file for complete search history.

(56) References Cited

U.S. PATENT DOCUMENTS

| | | | |
|---|---|---|---|
| 2007/0260675 A1* | 11/2007 | Forlines | G06F 9/52 709/203 |
| 2009/0102915 A1 | 4/2009 | Arsenich | |
| 2010/0189413 A1 | 7/2010 | Yoshino | |
| 2010/0201790 A1* | 8/2010 | Son | G02B 27/2264 348/53 |
| 2010/0245685 A1 | 9/2010 | Onodera et al. | |
| 2011/0007390 A1* | 1/2011 | Yanamoto | G02B 27/2214 359/466 |
| 2011/0025833 A1* | 2/2011 | Baik | G02B 27/2242 348/58 |
| 2011/0234605 A1* | 9/2011 | Smith | G02B 27/2214 345/522 |
| 2011/0242441 A1* | 10/2011 | Minami | G02B 5/0215 349/15 |
| 2011/0304601 A1* | 12/2011 | Niioka | G02B 27/2214 345/209 |
| 2012/0044330 A1* | 2/2012 | Watanabe | G02B 27/2214 348/54 |
| 2012/0056876 A1* | 3/2012 | Lee | H04N 13/0434 345/419 |
| 2012/0139897 A1* | 6/2012 | Butler | G06F 3/041 345/419 |
| 2012/0139908 A1* | 6/2012 | Choi | H04N 13/0402 345/419 |
| 2012/0154450 A1* | 6/2012 | Aho | G02B 27/22 345/690 |
| 2012/0176322 A1* | 7/2012 | Karmi | G06F 3/04883 345/173 |
| 2012/0194751 A1* | 8/2012 | Lo | B60J 7/1628 349/15 |
| 2013/0033490 A1* | 2/2013 | Zhang | G06T 15/20 345/419 |
| 2015/0172643 A1 | 6/2015 | Yoshino | |
| 2015/0189260 A1 | 7/2015 | Yoshino | |
| 2016/0035139 A1* | 2/2016 | Fuchs | G02B 27/017 345/633 |

FOREIGN PATENT DOCUMENTS

| | | |
|---|---|---|
| CN | 101852973 | 10/2010 |
| EP | 2 280 553 | 2/2011 |
| JP | 2010-109414 | 5/2010 |
| JP | 2011-17788 | 1/2011 |
| JP | 2011-28263 | 2/2011 |
| JP | 2011-54069 | 3/2011 |
| WO | 02011/044936 | 4/2011 |

OTHER PUBLICATIONS

International Search Report dated Mar. 19, 2013 in International (PCT) Application No. PCT/JP2012/008172.

* cited by examiner

FIG. 9
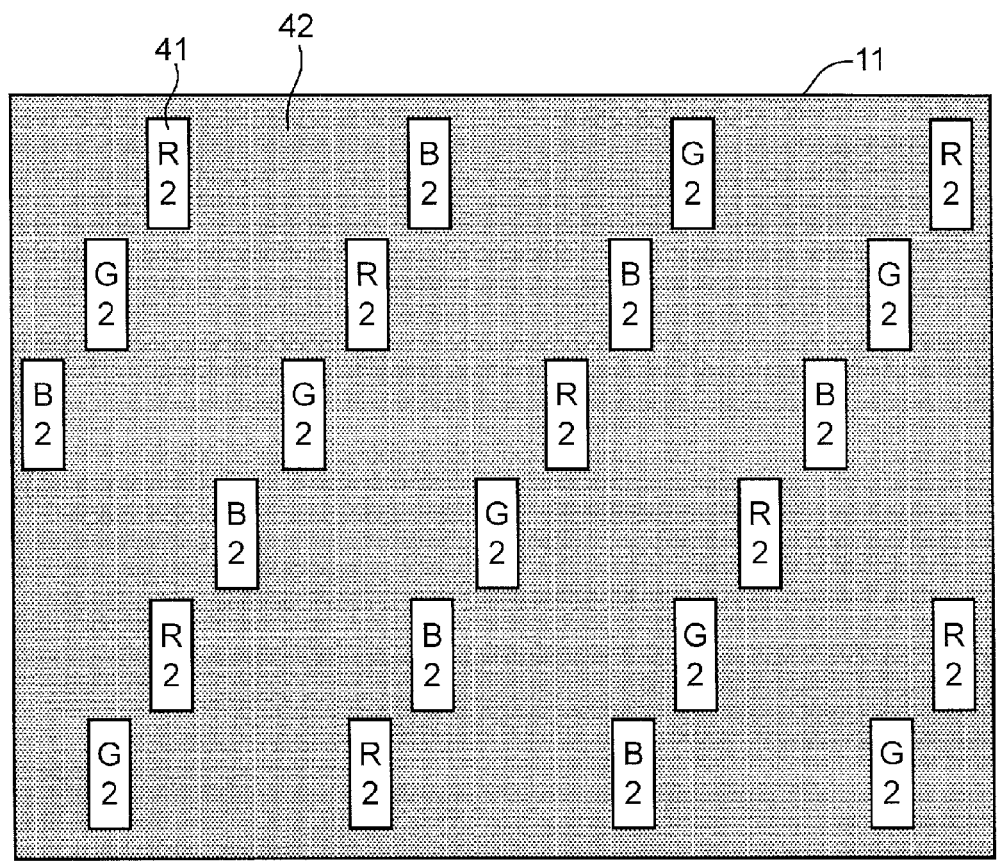
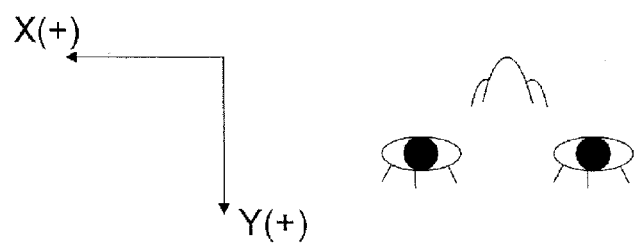

FIG. 15
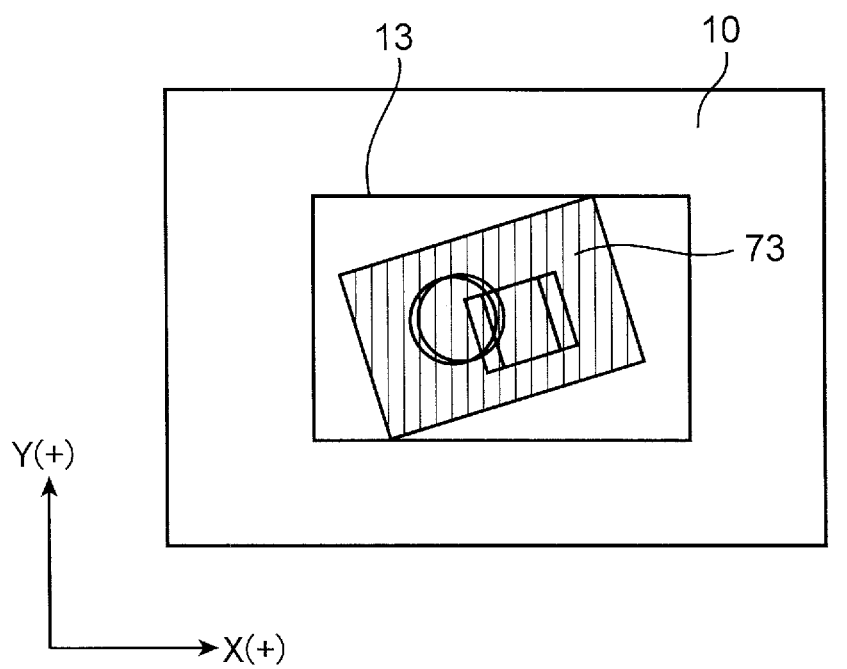

DISPLAY DEVICE

TECHNICAL FIELD

The present invention relates to a display device for stereoscopically displaying information using a barrier or lenticular lens to a flat display (plasma, liquid crystal, EL (Electro Luminescence), etc.) in the field of televisions, computers, digital signage, game machines, medical equipment and the like.

BACKGROUND ART

There has conventionally existed a video display device that has a display device in which a switching operation on a switch can manually switch between vertical display and horizontal display, and a video separation unit such as a parallax barrier or lenticular lens disposed on the front surface of the display device, wherein the display device combines left-eye image data and right-eye image data corresponding to the video separation unit into a single piece of parallax image data. There is also a video display device in which the position of the display screen in relation to the video display device is detected, to switch between vertical display and horizontal display of the video separation unit and the display device in accordance with the detected position (see, for example, Patent Literature 1).

FIG. 16 is a diagram showing the schematic configuration of the conventional video display device described in Patent Literature 1.

In FIG. 16, an observer observes a display device 201 through a video separation unit 202 located between the observer and the display device 201. In the display device 201, a reference pixel P(1, 1) is located at the upper left of the display device 201. A pixel row is configured by a plurality of subpixels arranged starting from the reference pixel P in an X-axis (+) direction, and a pixel column is configured by a plurality of subpixels arranged starting from the reference pixel P in a Y-axis (−) direction. The image data displayed in the display device 201 and the configuration of the parallax barrier of the video separation unit 202 are controlled using the information on the position of the display device 201 detected by a position sensor 203 of the video display device, so as to allow the observer to stereoscopically view the resultant video.

In addition, in the conventional video display device that has a display device for displaying a plurality of parallax images combined into one screen and a video separation unit fixed on the front surface of the display device, normal stereoscopic vision is possible only in the vertical or horizontal display state. On the other hand, there is a video display device capable of achieving stereoscopic vision in both the vertical and horizontal directions while having a fixed parallax barrier, by optimizing a barrier pattern of the parallax barrier and displaying a plurality of parallax images corresponding to the barrier pattern in a single screen, with the direction of the parallax images being oriented to the rotation angle of the display screen (see Patent Literature 2, for example).

FIGS. 17 and 18 are diagrams each showing the pixel arrangement of the conventional video display device described in Patent Literature 2.

FIG. 17 is a diagram showing a pixel arrangement pattern for four-viewpoints, in which the display device of the conventional video display device is in a first placement state. FIG. 18 is a diagram showing a pixel arrangement pattern for four-viewpoints, in which the display device of the conventional video display device is in a second placement state obtained by rotating the display device 90 degrees from the first placement state. An observer observes the video display device through an opening of the parallax barrier located on the front surface of the display device 201. Therefore, the arrangement pattern of subpixels in the display device 201 and the barrier pattern in the parallax barrier are optimized so that only a group of first-viewpoint pixels (B1, R1, G1) 211, for example, can be seen. Note that a group of pixels (R2, G2, B2) 212 corresponds to second-viewpoint pixels, a group of pixels (R3, G3, B3) 213 third-viewpoint pixels, and a group of pixels (R4, G4, B4) 214 fourth-viewpoint pixels.

Patent Literature 2, therefore, enables stereoscopic vision in both the vertical and horizontal display states in a single video display device.

For example, in the case where the video display device is placed on a desk with its display surface facing up, the conventional video display device, unfortunately, cannot determine the direction in which the observer observes the video display device, and therefore cannot always provide an ideal display condition to the observer.

Moreover, in a stationary-type video display device where the top and bottom of its display surface are not established, or in the case where observers are present at the top and bottom of the display surface, the conventional configuration need to create a composite parallax video based on a certain observer, as well as an inverted composite parallax video. In addition, there is not known a video display device that executes stereoscopic display in accordance with the positions of observers present at the top and bottom of the display surface, to allow the observers to stereoscopically view the images correctly and simultaneously.

Another problem with the conventional configuration is that, when an observer observes the video display device that is tilted, stereoscopic vision cannot be executed correctly because the conventional configuration only executes vertical display or horizontal display.

CITATION LIST

Patent Literature

Patent Literature 1: Japanese Patent Application Publication No. 2010-109414.
Patent Literature 2: Japanese Patent Application Publication No. 2011-17788.

SUMMARY OF THE INVENTION

The present invention was contrived in view of the foregoing problems, and an objet thereof is to provide a display device capable of displaying a composite image in accordance with the position of an observer.

A display device according to one aspect of the present invention has: a display unit that includes a display surface emitting video light for displaying a composite image of a first image and a second image different from the first image; a separation unit that separates the video light into first video light representing the first image and second video light representing the second image; a detection unit that detects a position of an observer looking at the composite image; and an image control unit that controls a direction of the composite image in accordance with the position of the observer detected by the detection unit.

According to this configuration, the display unit includes a display surface that emits video light for displaying a composite image of a first image and a second image different from the first image. The separation unit separates the video light into first video light representing the first image and second video light representing the second image. The detection unit detects the position of an observer looking at the composite image. The image control unit controls the direction of the composite image in accordance with the position of the observer detected by the detection unit.

According to the present invention, the composite image can be displayed in accordance with the position of the observer because the direction of the composite image of the first image and the second image different from the first image is controlled depending on the detected position of the observer.

The object, features and advantages of the present invention will become more apparent from the following detailed description and the accompanying drawings.

DESCRIPTION OF EMBODIMENTS

FIG. 9 is a diagram showing a barrier pattern of the parallax barrier corresponding to the pixel arrangement pattern shown in FIG. 8, in which the video display device is observed in the Y-axis (−) direction.

FIG. 15 is a diagram showing a display example of the display unit, in which the video display device is rotated approximately 90 degrees, 180 degrees, and 270 degrees clockwise within the plane parallel to the display surface.

BEST MODE FOR CARRYING OUT THE INVENTION

Embodiments of the present invention are described hereinafter with reference to the drawings. Note that the following embodiments are merely examples for embodying the present invention and not to limit the technical scope of the present invention.

(Embodiment) 1

Figure 1:
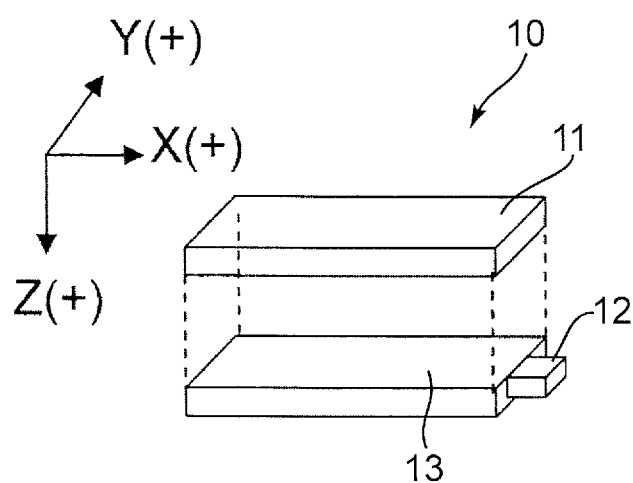
FIG. 1 is a diagram showing the schematic configuration of a video display device according to Embodiment 1 of the present invention.
Figure 2:
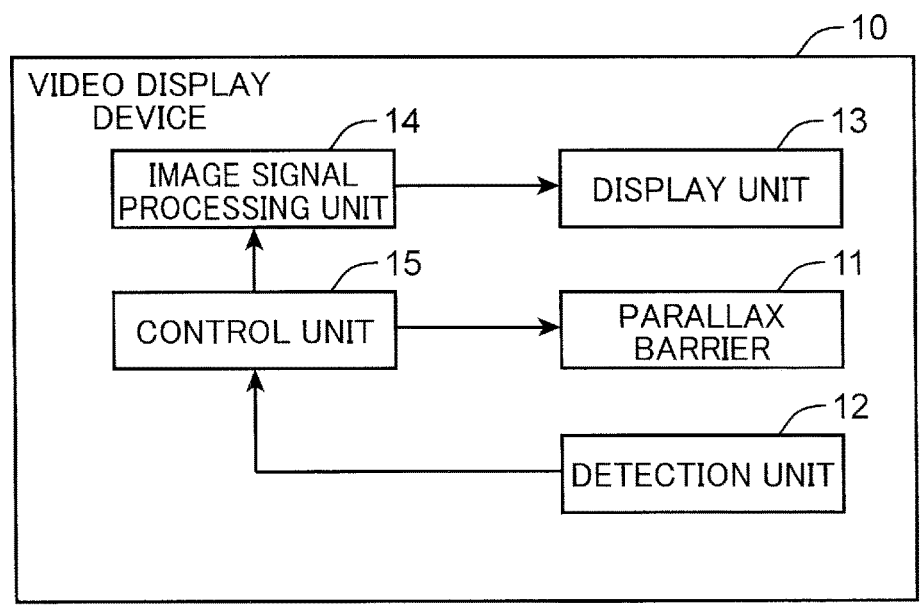
FIG. 2 is a block diagram showing the configuration of the video display device according to Embodiment 1 of the present invention.

FIG. 1 is a diagram showing the schematic configuration of a video display device according to Embodiment 1 of the present invention. FIG. 2 is a block diagram showing the configuration of the video display image according to Embodiment 1 of the present invention.

As shown in FIG. 1, the video display device 10 has a display unit 13 for displaying a composite image combining a plurality of images, a parallax barrier 11 disposed facing a display surface of the display unit 13, and a detection unit 12 for detecting the position of the eyes of an observer.

The display unit 13 spatially divides a plurality of parallax images, the number of which corresponds to the number of stereoscopic viewpoints, combines them within one screen, and displays it in a display region for executing stereoscopic vision. In the display unit 13, a reference subpixel is located at the upper left of the display surface of the display unit 13. A pixel row is configured by a plurality of subpixels arranged starting from the reference subpixel in an X-axis (+) direction, and a pixel column is configured by a plurality of subpixels arranged starting from the reference subpixel in a Y-axis (−) direction. The display unit 13 also displays a one-viewpoint image in a display region that does not execute stereoscopic vision.

The parallax barrier 11 has a barrier pattern configured by slit portions 41 transmitting video light from the display unit 13 and a shielding portion 42 shielding the video light, as will be described hereinafter. The parallax barrier 11 optically separates a composite image, displayed by the display unit 13, by means of the barrier pattern so that the composite image can be observed stereoscopically. The detection unit 12 acquires a video of an observer through a CCD (Charge Coupled Device) to detect the position of the head or the left and right eyes by detecting the face of the observer.

As shown in FIG. 2, the video display device 10 has the parallax barrier 11, the detection unit 12, the display unit 13, an image signal processing unit 14, and a control unit 15.

The display unit 13 has a display surface in which subpixels of a plurality of colors are arranged two-dimensionally. The display unit 13 is, for example, a plasma display, a liquid crystal display, an organic EL (Electro Luminescence) display, or the like. The display unit 13 has the subpixels of a plurality of colors arranged in a predetermined pattern and displays a composite image obtained by combining a plurality of images that vary depending on the viewpoints of the observer. Note that the composite image includes not only a plurality of parallax images to be observed stereoscopically that are captured from different viewpoints, but also images captured from the same viewpoint.

The display unit 13 also includes a display surface that emits video light for displaying a composite image of a first image and a second image different from the first image. Note that the first image is a left image observed by the left eye, and the second image a right image observed by the right eye.

The parallax barrier 11 separates the composite image, displayed by the display unit 13, in accordance with the viewpoints of the observer. The parallax barrier 11 sees parallax images corresponding to the different viewpoints of the left and right eyes of the observer and separates the composite image so as to allow the observer to observe a stereoscopic video. The parallax barrier 11 has slit portions transmitting the video light from the display unit 13 and a shielding portion shielding the video light. The parallax barrier 11 is configured by, for example, a liquid crystal or a resin.

The parallax barrier 11 also separates the video light into first video light representing the first image and second video light representing the second image. The parallax barrier 11 separates the video light in such a manner as to input left video light representing the left image to the left eye and right video light representing the right image to the right eye.

The detection unit 12 detects the position of the observer. The detection unit 12 detects the position of the eyes of the observer. The detection unit 12 is configured by, for example, a CCD. The detection unit 12 films a space in 360 degrees around the video display device 10 to detect the position of the eyes of the observer from the captured video. Note that the detection unit 12 may detect the position of the head of the observer. In addition, in this Embodiment 1, the detection unit 12 is disposed in the main body including the display unit 13, but the present invention is not particularly limited to this configuration. Thus, the detection unit 12 may be disposed in a position where it can overlook the space around the display unit 13.

The control unit 15 controls the direction of the composite image in accordance with the position of the observer detected by the detection unit 12. The control unit 15 controls a display position of the composite image in such a manner that a lower portion of the composite image is directed to where the observer is present, based on the position of the head or the eyes of the observer, which is detected by the detection unit 12. Using the information obtained from the detection unit 12, the control unit 15 determines a display region on the display unit in which stereoscopic vision is executed, and a viewpoint corresponding to each subpixel.

The composite image includes a first image region and a second image region that is displayed between the first image region and the observer when the observer is present in a first position. In the case where the detection unit 12 detects the presence of the observer in a second position different from the first position, the control unit 15 controls the direction of the composite image so that the second image region is displayed between the first image region and the observer present in the second position.

The image signal processing unit 14 controls the display unit 13. The image signal processing unit 14 combines a plurality of parallax image data pieces to be displayed in a display region on the display unit in which stereoscopic vision is executed, as determined by the control unit 15, and two-dimensional image data to be displayed in the display region in which stereoscopic vision is not executed, into a single image.

Note that, in this Embodiment 1, the video display device 10 corresponds to an example of the display device, the display unit 13 to an example of the display unit, the parallax barrier 11 to an example of the separation unit, the detection unit 12 to an example of the detection unit, and the control unit 15 to examples of the image control unit and barrier pattern control unit.

Figure 3:
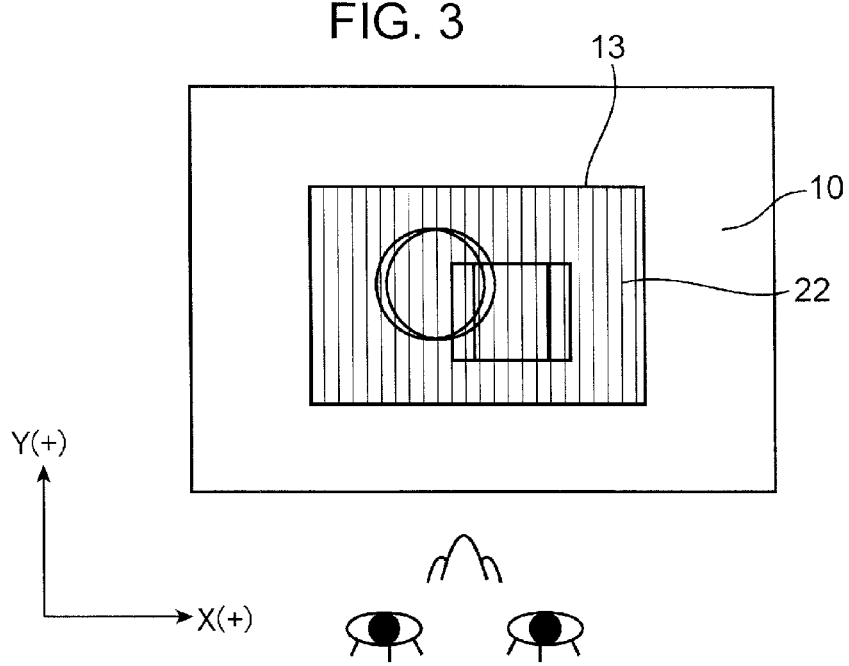
FIG. 3 is a diagram showing the relationship between an observer and the video display device, in which the observer observes the video display device in a Y-axis (+) direction, according to Embodiment 1 of the present invention.
Figure 4:
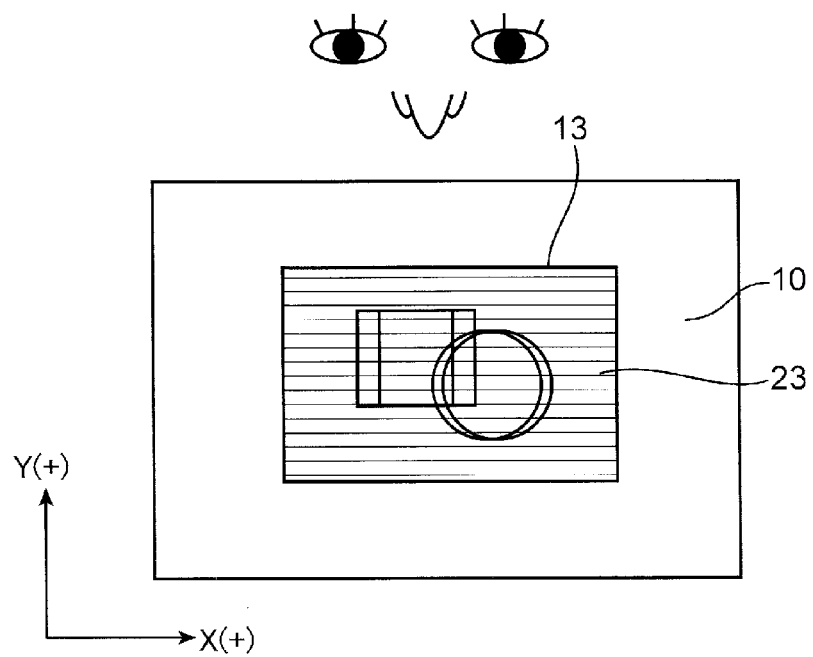
FIG. 4 is a diagram showing the relationship between the observer and the video display device, in which the observer observes the video display device in a Y-axis (−) direction, according to Embodiment 1 of the present invention.

FIG. 3 is a diagram showing the relationship between the observer and the video display device 10, in which the observer looks at the video display device 10 in a Y-axis (+) direction, according to Embodiment 1 of the present invention. FIG. 4 is a diagram showing the relationship between the observer and the video display device 10, in which the observer observes the video display device 10 in the Y-axis (−) direction, according to Embodiment 1 of the present invention. The phrase "in which the observer looks at the video display device 10 in the Y-axis (+) direction (Y-axis (−) direction)" may be rephrased as "in which the observer looks at the video display device 10 with the Y-axis (+) direction (Y-axis (−) direction) being laid on top of the line of sight." In other words, the situation where the observer observes the video display device 10 in the Y-axis (+) direction (Y-axis (−) direction) includes a situation where the observer looks at the video display device 10, which is placed vertically upright, from a position in front of the screen thereof. In addition, the situation where the observer observes the video display device 10 in the Y-axis (+) direction (Y-axis (−) direction) includes a situation where the observer looks down the screen of the video display device 10, which is laid flat on a table or placed horizontally, from obliquely above. Furthermore, the situation where the observer looks at the video display device 10 in the Y-axis (+) direction (Y-axis (−) direction) includes a situation where the observer holds the video display device 10 to look at the screen thereof or where the observer looks at the screen of the video display device 10 placed upright or horizontally.

Figure 5:
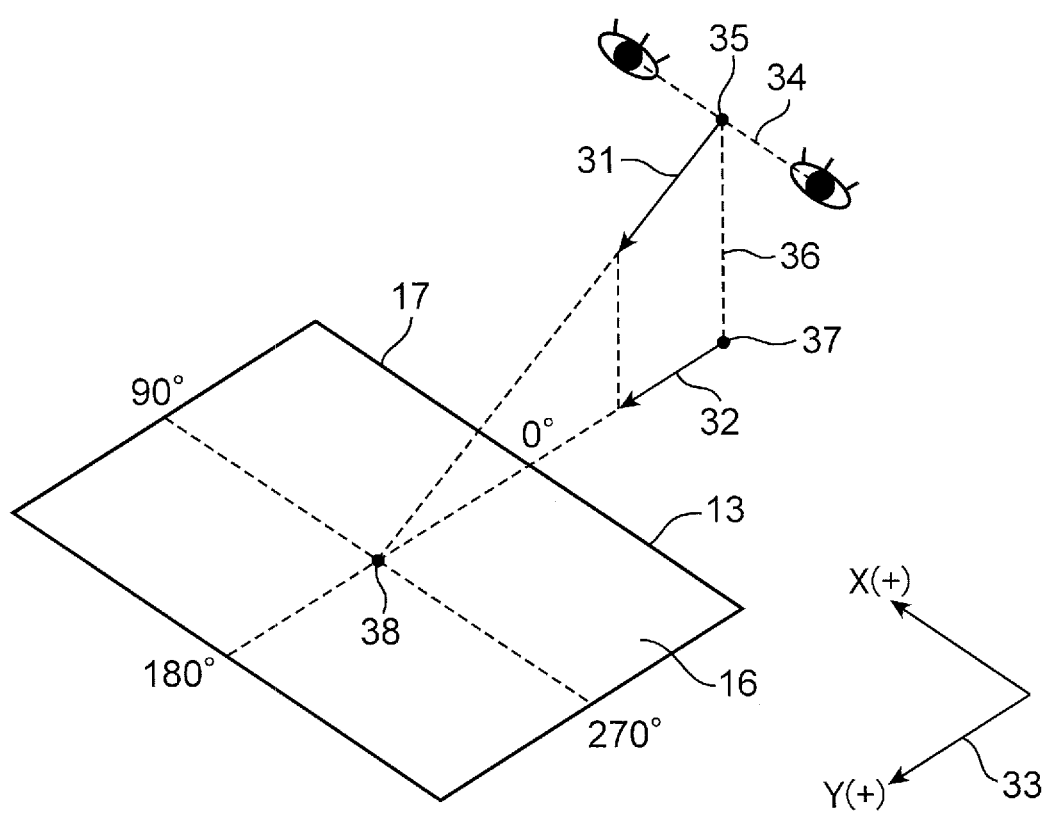
FIG. 5 is a diagram for explaining an observation direction according to Embodiment 1 of the present invention.

FIG. 5 is a diagram for explaining an observation direction according to Embodiment 1 of the present invention.

The detection unit 12 detects the position of the eyes of the observer. The control unit 15 specifies an observation direction 32 in which a direction 31 extending from the position of the eyes of the observer, detected by the detection unit 12, toward a display surface 16 of the display unit 13 is projected onto a plane including the display surface 16, and controls the display position of the composite image in accordance with the angle between the specified observation direction 32 and a predetermined reference direction 33. Note that in the case where the positions of the body and eyes of the observer have a center 38 of the display surface 16 of the display unit 13 therebetween when the observer looks at the video display device 10, the control unit 15 controls the direction and display position of the composite image in view of the information on the position of the body of the observer.

For example, the control unit 15 controls the display position of the composite image in accordance with the angle that is formed by the observation direction 32 extending from an intersection point 37 of a perpendicular line 36 and a plane toward a center 38 of the display surface 16 and the reference direction 33 on the display surface 16 of the display unit 13, the perpendicular line 36 extending from a middle point 35 of a straight line 34 connecting the eyes of the observer, detected by the detection unit 12, toward the plane including the display surface 16 of the display unit 13.

In this case, the display surface 16 is in a quadrangular shape. The reference direction 33 is the Y-axis (+) direction that is perpendicular to a reference side 17 out of a plurality of sides of the display surface 16.

In the case where the angle between the observation direction 32 and the reference direction 33 is 0 degrees, the control unit 15 matches the base of the composite image with the reference side 17. Also, in the case where the angle between the observation direction 32 and the reference direction 33 is a predetermined angle, the control unit 15 rotates the base of the composite image by the predetermined angle from the reference side 17. In other words, when the angle between the observation direction 32 and the reference direction 33 is 90 degrees, the control unit 15 rotates the base of the composite image by 90 degrees from the reference side 17. Moreover, in the case where the angle between the observation direction 32 and the reference direction 33 is 180 degrees, the control unit 15 rotates the base of the composite image by 180 degrees from the reference side 17. In the case where the angle between the observation direction 32 and the reference direction 33 is 270 degrees, the control unit 15 rotates the base of the composite image by 270 degrees from the reference side 17.

In the case where the observation direction 32 matches the reference direction 33, the angle between the observation direction 32 and the reference direction 33 is 0 degrees, as described above. In the case where the observation direction 32 faces the reference direction 33, the angle between the observation direction 32 and the reference direction 33 is 180 degrees. In the case where the observation direction 32 moves 90 degrees counterclockwise from the reference direction 33, the angle between the observation direction 32 and the reference direction 33 is 90 degrees. In the case where the observation direction 32 moves 270 degrees counterclockwise from the reference direction 33, the angle between the observation direction 32 and the reference direction 33 is 270 degrees.

The detection unit 12 not only detects the position of the eyes of the observer but also specifies the observation direction by determining whether the observer observes the video display device 10 in the Y-axis (+) direction or the Y-axis (−) direction. The observation direction can be determined by, for example, detecting the nose or mouth together with the eyes and using the positional relationship between the eyes and the nose or the positional relationship between the eyes and the mouth. The detection unit 12, therefore, can specify whether the observation direction is in the Y-axis (+) direction, the Y-axis (−) direction, the X-axis (+) direction, or the X-axis (−) direction, as well as how many degrees the observation direction is inclined with respect to the Y-axis (+) direction.

In FIG. 3, stereoscopic display is executed for the observer in a display region 22 within the display surface of the display unit 13. By using the information on the position of the eyes obtained from the detection unit 12 and the information on each slit position of the parallax barrier 11 between the observer and the display unit 13, the control unit 15 spatially divides a plurality of parallax images and combines them within the display region to allow the observer to observe the displayed video stereoscopically. The direction of the composite image that is displayed in the display region 22 of the display unit 13 for executing stereoscopic display is controlled using the information on the position of the eyes of the observer obtained by the detection unit 12. Note that the display region 22 within the display surface of the display unit 13 in which stereoscopic display is executed does not have to configure the entire screen. For example, the display region 22 may be configured only within a window located at a predetermined position within the screen. In this case, the control unit 15 rearranges the plurality of parallax images based on the position where the window starts and the window size so that stereoscopic vision can be achieved when the screen is observed in the Y-axis (+) direction as shown in FIG. 3.

Figure 6:
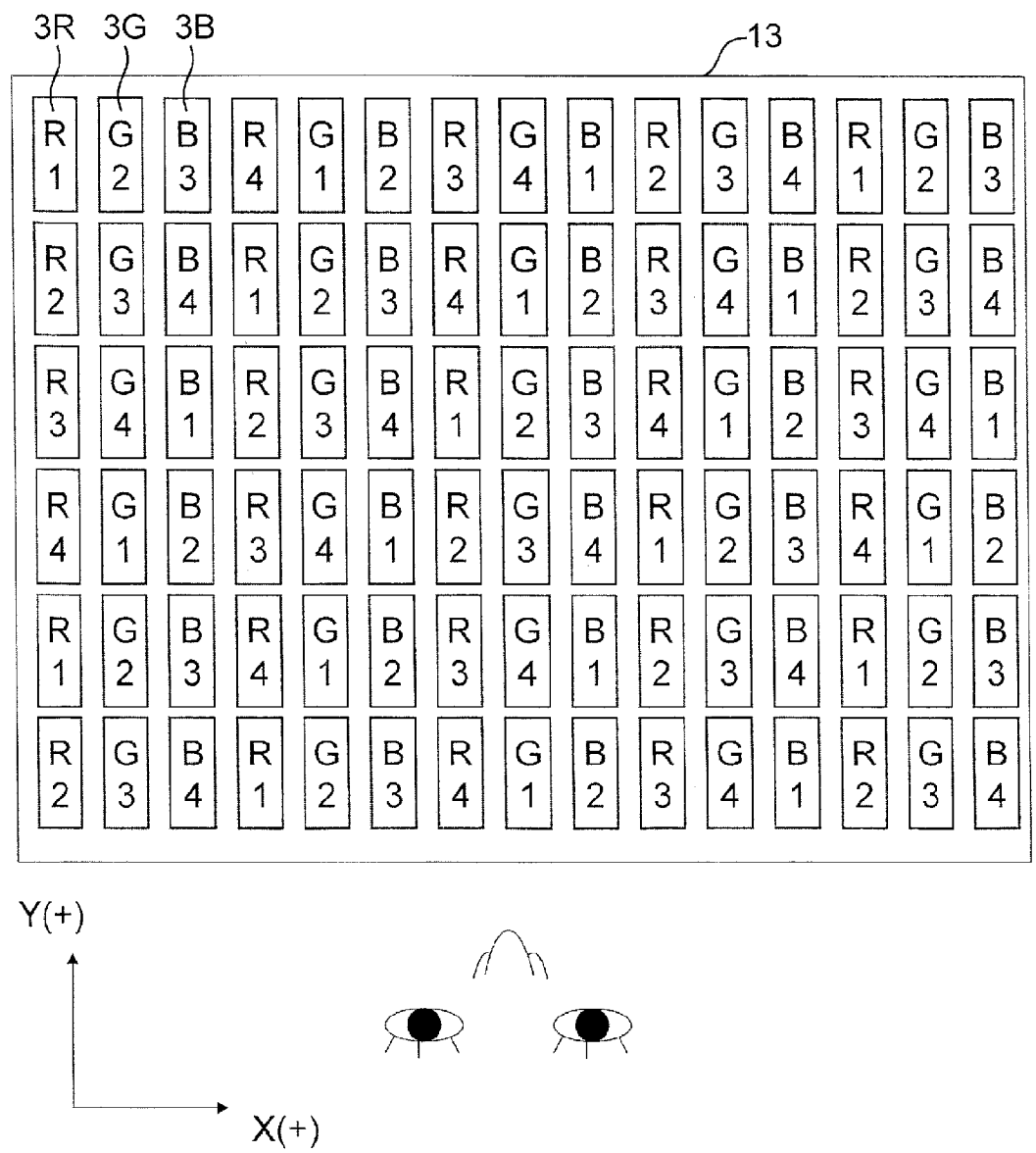
FIG. 6 is a diagram showing an example of a pixel arrangement pattern for four-viewpoints in a display region a display unit in which stereoscopic display is executed when the video display device is observed in the Y-axis (+) direction as shown in FIG. 3.

FIG. 6 is a diagram showing an example of a pixel arrangement pattern for four-viewpoints in a display region 22 of a display unit 13 in which stereoscopic display is executed when the video display device 10 is observed in the Y-axis (+) direction as shown in FIG. 3. The display surface of the display unit 13 has subpixels 3R, 3G and 3B in three colors, R (red), G (green) and B (blue) arranged two-dimensionally in a predetermined pattern. When stereoscopic display corresponding to N viewpoints (four viewpoints in this case) is executed, the display unit 13 displays N parallax images divided spatially into N within one screen. When stereoscopic display corresponding to four viewpoints is executed, the display unit 13 displays four parallax images divided spatially into four within one screen. In FIG. 6, a group of subpixels (R1, G1, B1) is a first-viewpoint pixel. In addition, a group of subpixels of (R2, G2, B2) is a second-viewpoint pixel, and a group of subpixels (R3, G3, B3) a third-viewpoint pixel, and a group of subpixels (R4, G4, B4) a fourth-viewpoint pixel.

The arrangement pattern of four-viewpoint pixels in the display region 22 in which stereoscopic display is executed is changed by the information on the position of the eyes obtained from the detection unit 12 and the information on each slit position of the parallax barrier 11 between the observer and the display unit 13. In FIG. 6, the viewpoint number of the top-left pixel is changed. However, the arrangement of the first-viewpoint pixel, the second-viewpoint pixel, the third-viewpoint pixel, and the fourth-viewpoint pixel from the left does not change. The arrangement of the pixels for the same viewpoints that are disposed diagonally downward left, does not change either. Note that the control unit 15 may determine an appropriate pixel arrangement pattern when the detection unit 12 detects a change in the observation direction of the observer. The control unit 15 may also change the pixel arrangement pattern in real time when the detection unit 12 detects a change in the relative positional relationship between the observer and the video display device 10 in which viewpoint of the observer toward the display surface is changed in a horizontal or vertical direction.

In the case where the video display device 10 is laid flat, the observer might move not only in a horizontal direction (longitudinal direction) but also in a perpendicular direction (vertical direction) with respect to the display surface. In the case where the observer holds the video display device 10 to observe the display surface, the observer faces the display surface and therefore hardly observes the display surface in the vertical direction, which is why, in the past, it was not necessary to control the display unit or separation unit in response to a vertical movement of the observer. However, when the video display device 10 is laid flat, it is necessary to control the display unit or separation unit in response to a vertical movement of the observer.

Especially when each slit portion is formed at an inclination as described above, an effective visual region (a region in which stereoscopic vision can be achieved properly) of the parallax barrier is formed at an inclination in a state in which the observer faces the display surface. This creates a problem in which the viewpoint of the observer changes when the observer moves in the vertical direction (perpendicular direction with respect to the display surface). As a result, the viewpoint images that can be observed by the left and right eyes of the observer change and eventually enter a pseudoscopic state as the observer approaches or moves away from the horizontally laid video display device 10 (moves in the vertical direction in case of the examples shown in FIGS. 3 and 4) while keeping his/her gazing point at the center of the screen. For example, in the case where a parallax barrier for four viewpoints is used, a vertical effective visual range at the center of the screen is approximately ±30 cm.

In this case, the control unit 15 may control the display position of the composite image in accordance with the angle between the direction 31 and the display surface 16, the direction 31 extending from the position of the eyes of the observer detected by the detection unit 12 toward the display surface 16 of the display unit 13. In so doing, the control unit 15 may control the display position of the composite image in accordance with the angle between the direction 31 and the display surface 16 and the information on the barrier pattern of the parallax barrier 11.

More specifically, the detection unit 12 detects the position of the eyes of the observer. The control unit 15 may specify the direction 31 extending from the position of the eyes of the observer detected by the detection unit 12 toward the display surface 13, and control the display position of the composite image in accordance with the information on the position of the eyes of the observer in the specified direction 31 and the information on the position of the parallax barrier 11.

In this manner, the pixel arrangement pattern of the composite image can be changed in accordance with not only a change in the position of the observer in the horizontal direction but also a change in the position of the observer in the vertical direction.

Figure 7:
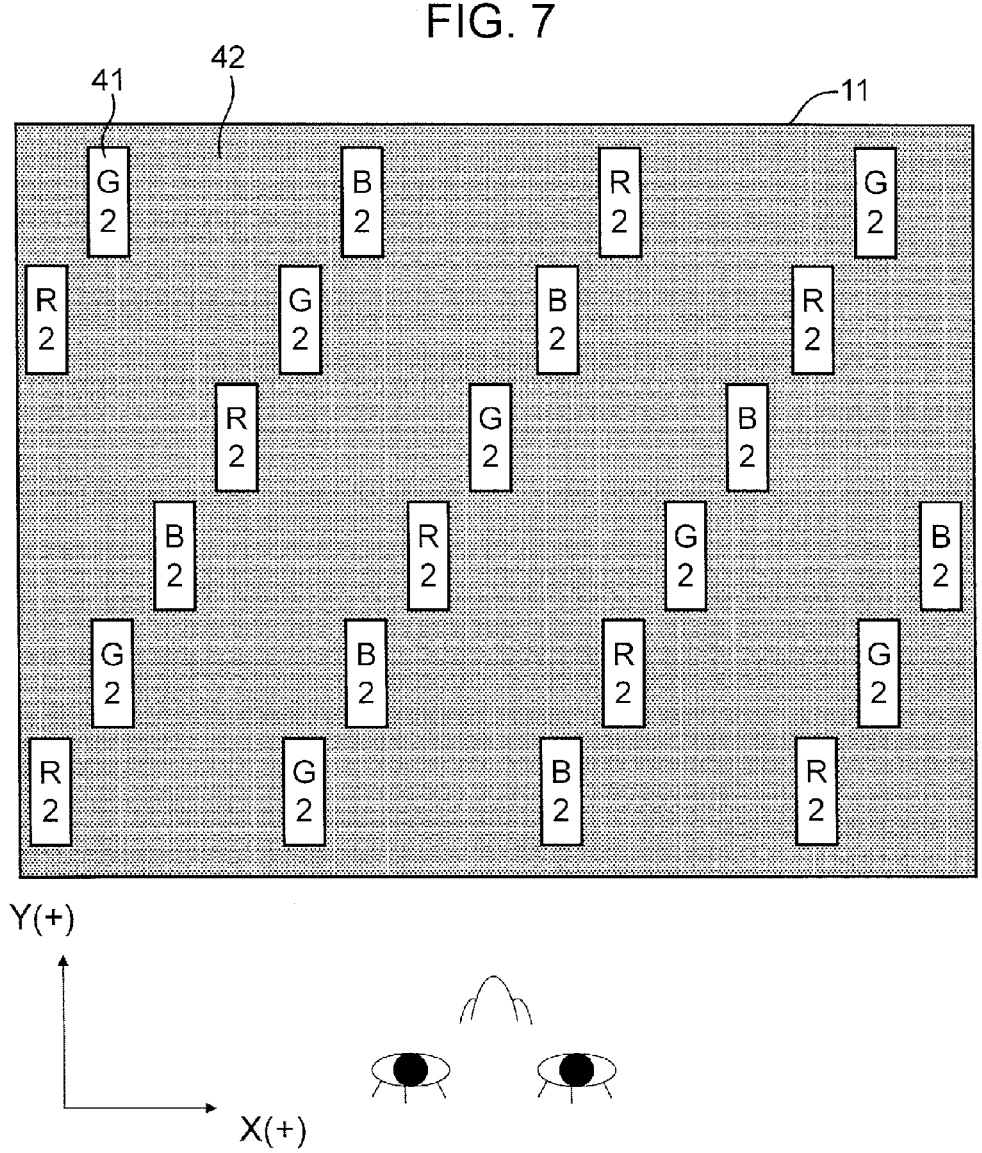
FIG. 7 is a diagram showing a barrier pattern of a parallax barrier corresponding to the pixel arrangement pattern shown in FIG. 6, in which the video display device is observed in the Y-axis (+) direction by the observer.

FIG. 7 is a diagram showing the barrier pattern of the parallax barrier corresponding to the pixel arrangement pattern shown in FIG. 6 in the case where the video display device is observed in the Y-axis (+) direction by the observer. As shown in FIG. 7, the parallax barrier 11 has slit portions 41 for transmitting the video light from the display unit 13, and a shielding portion 42 for shielding the video light. The slit portions 41 and the shielding portion 42 form a barrier pattern.

Note that FIG. 7 shows a barrier pattern corresponding to a pixel arrangement pattern for four-viewpoints in the display region 22 of the display unit 13 in which stereoscopic display is executed, and shows a state in which only a group of second-viewpoint subpixels (R2, G2, B2) is observed by one of the eyes (e.g., the right eye) of the observer via the slit portions 41 of the parallax barrier 11. In the case where the observation position of the observer is moved in the horizontal direction (X-axis direction), there exist a position where only a group of first-viewpoint subpixels (R1, G1, B1) is observed via the slit portions 41, a position where only a group of third-viewpoint subpixels (R3, G3, B3) is observed, and a position where only a group of fourth-viewpoint subpixels (R4, G4, B4) is observed. A barrier pattern is created in such a manner that only a specific group of viewpoint subpixels is observed in an observation direction.

Figure 8:
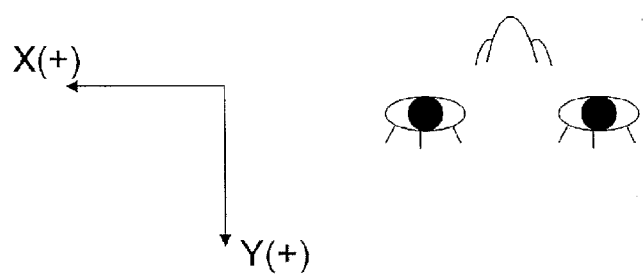
FIG. 8 is a diagram showing an example of a pixel arrangement pattern for four-viewpoints in a display region of the display unit in which stereoscopic display is executed when the video display device is observed in the Y-axis (−) direction as shown in FIG. 4.

FIG. 8 is a diagram showing an example of a pixel arrangement pattern for four-viewpoints in a display region 23 of the display unit 13 in which stereoscopic display is executed when the video display device 10 is observed in the Y-axis (−) direction as shown in FIG. 4. In case of performing stereoscopic display corresponding to four viewpoints, the display unit 13 displays four parallax images divided spatially into four sections within one screen. In FIG. 8, a group of subpixels (B1, G1, R1) is corresponds to the first-viewpoint pixel. A group of subpixels (B2, G2, R2) corresponds to the second-viewpoint pixel, and a group of subpixels (B3, G3, R3) to the third-viewpoint pixel. A group of subpixels (B4, G4, R4) corresponds to the fourth-viewpoint pixel.

The arrangement pattern of four-viewpoint pixels of the display region 23 in which stereoscopic display is executed, is changed by the information on the position of the eyes obtained from the detection unit 12 and the information on the slit positions of the parallax barrier 11 between the observer and the display unit 13. In FIG. 8, the viewpoint number of the top-left pixel is changed. However, the arrangement of the first-viewpoint pixel, the second-viewpoint pixel, the third-viewpoint pixel, and the fourth-viewpoint pixel from the left does not change. The arrangement of the pixels for the same viewpoints that are disposed diagonally downward left, does not change either. Note that the control unit 15 may determine an appropriate pixel arrangement pattern when the detection unit 12 detects a change in the observation direction of the observer. The control unit 15 may also change the pixel arrangement pattern in real time when the detection unit 12 detects a change in the relative positional relationship between the observer and the video display device 10 in which the viewpoint of the observer toward the display surface is changed in the horizontal direction or the like.

FIG. 9 is a diagram showing a barrier pattern of the parallax barrier 11 corresponding to the pixel arrangement pattern shown in FIG. 8 in the case where the video display device 10 is observed in the Y-axis (−) direction. Note that FIG. 9 shows a barrier pattern corresponding to the arrangement pattern of four-viewpoint pixels of the display region 23 of the display unit 13 in which stereoscopic display is executed, and shows a state in which only a group of second-viewpoint subpixels (B2, G2, R2) is observed by one of the eyes (e.g., the right eye) of the observer via the slit portions 41 of the parallax barrier 11. In the case where the observation position of the observer is moved in the horizontal direction (X-axis direction), there exist a position where only a group of first-viewpoint subpixels (B1, G1, R1) is observed via the slit portions 41, a position where only a group of third-viewpoint subpixels (B3, G3, R3) is observed, and a position where only a group of fourth-viewpoint subpixels (B4, G4, R4) is observed. A barrier pattern is created in such a manner that only a specific group of viewpoint subpixels is observed in an observation direction.

(Embodiment) 2

Figure 10:
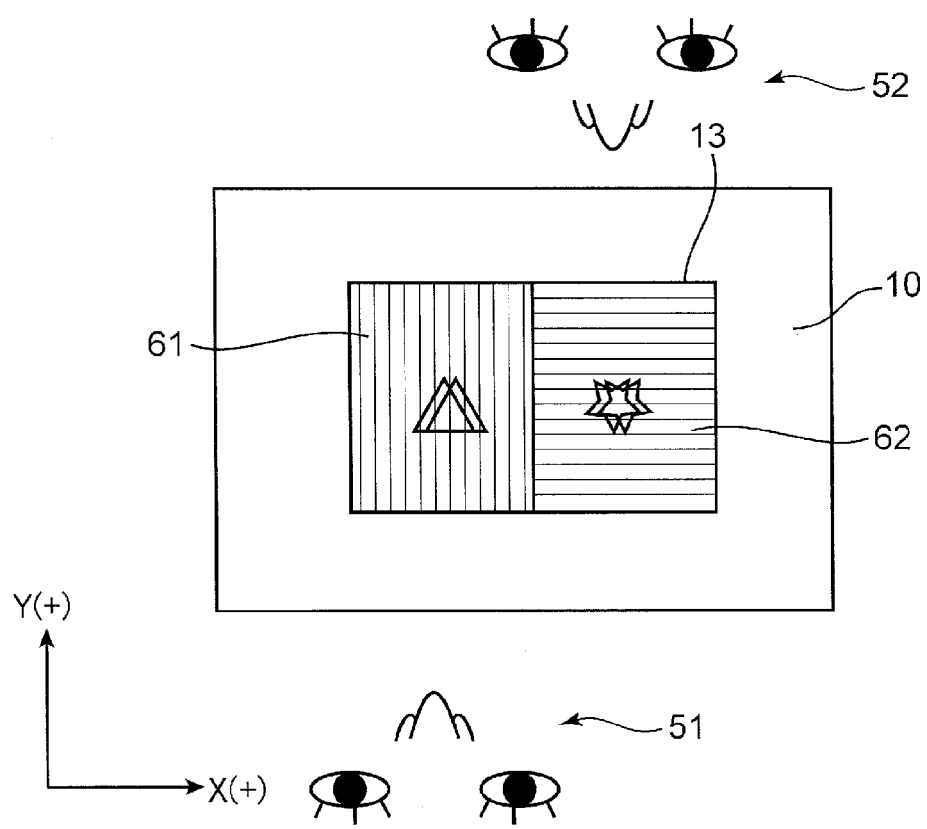
FIG. 10 is a diagram for explaining how two observers observe the display unit of the video display device, according to Embodiment 2.

FIG. 10 is a diagram for explaining how two observers observe the display unit 13 of the video display device 10, according to Embodiment 2. FIG. 10 shows a display example for the position where the angle between the observation direction of a first observer 51 and the reference direction (Y-axis (+) direction) of the video display device 10 is 0 degrees, and the position where the angle between the observation direction of a second observer 52 and the reference direction (Y-axis (+) direction) of the video display device 10 is 180 degrees.

Note that the configuration of the video display device according to Embodiment 2 is the same as that of the video display device 10 shown in FIGS. 1 and 2 according to Embodiment 1; thus, the detailed descriptions thereof are omitted accordingly, and only the configuration different from that of Embodiment 1 is described.

The detection unit 12 detects the positions of a plurality of observers. The detection unit 12 detects the positions of the heads or eyes of the plurality of observers. The control unit 15 divides the display surface of the display unit 13 into a plurality of display regions in accordance with the number of observers, and controls the direction of a composite image in each of the plurality of display regions in accordance with the positions of the plurality of observers detected by the detection unit 12.

In FIG. 10, the detection unit 12 detects the positions of the heads or eyes of the first observer 51 and the second observer 52. The control unit 15 divides the display surface of the display unit 13 into a first display region 61 and a second display region 62, and controls the direction of a composite image in each of the first and second display regions 61 and 62 in accordance with the positions of the heads or eyes of the first and second observers 51 and 52 that are detected by the detection unit 12.

In FIG. 10, stereoscopic display is executed for the first observer 51 in the first display region 61 within the display surface of the display unit 13, and stereoscopic display is executed for the second observer 52 in the second display region 62 within the display surface of the display unit 13. Using the information on the position of the eyes of the first observer 51 obtained from the detection unit 12 and the information on the positions of the slit portions 41 of the parallax barrier 11 between the first observer 51 and the display unit 13, the control unit 15 spatially divides a plurality of parallax images and combines them within the first display region 61 so as to allow the first observer 51 to stereoscopically observe the resultant image correctly. Also by using the information on the position of the eyes of the second observer 52 obtained from the detection unit 12 and the information on the positions of the slit portions 41 of the parallax barrier 11 between the second observer 52 and the display unit 13, the control unit 15 spatially divides a plurality of parallax images and combines them within the second display region 62 so as to allow the second observer 52 to stereoscopically observe the resultant image correctly. The direction of the composite image that is displayed in the first display region 61 of the display unit 13 that is observed stereoscopically by the first observer 51, and the direction of the composite image that is displayed in the second display region 62 of the display unit 13 that is observed stereoscopically by the second observer 52, are controlled by means of the information on the position of the eyes of each observer obtained by the detection unit 12.

Figure 11:
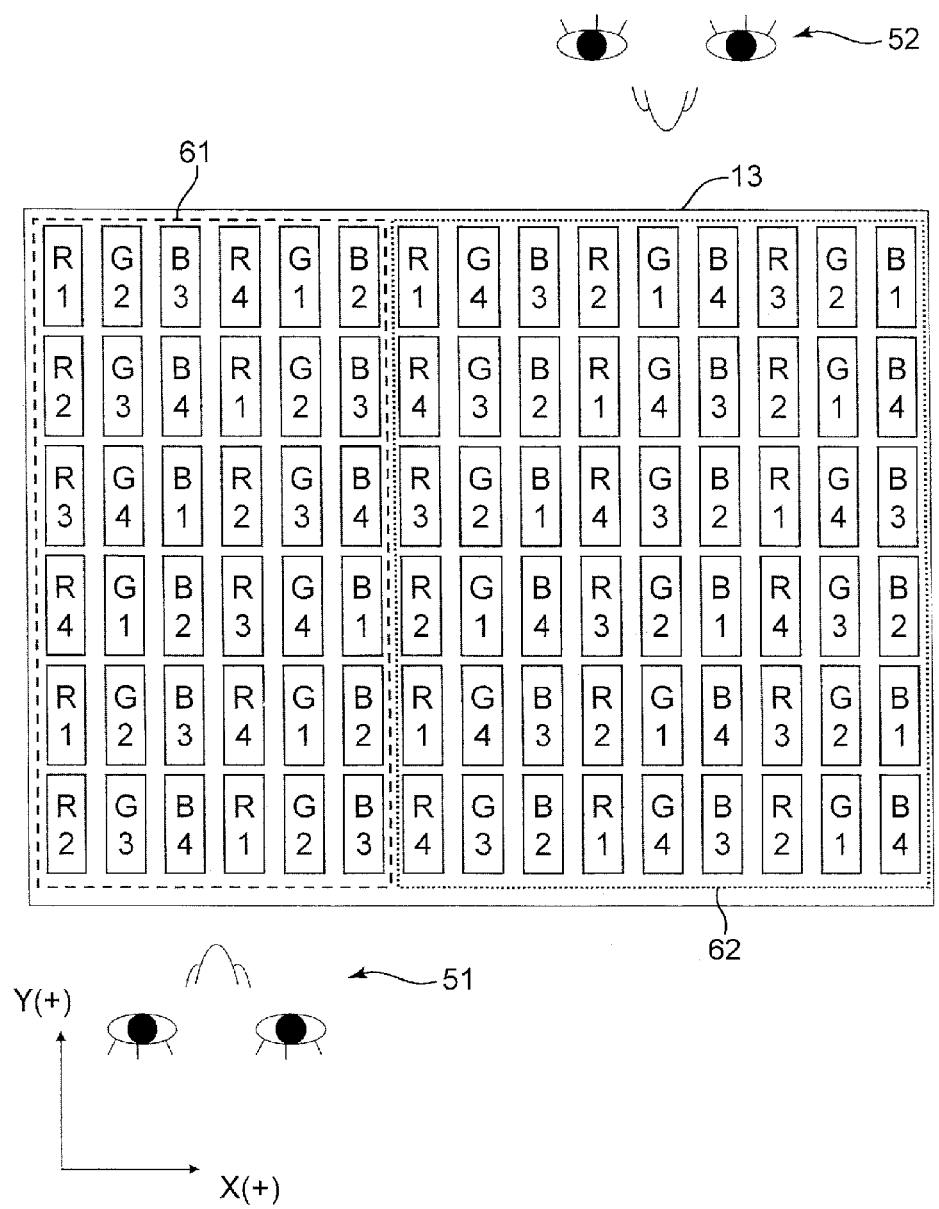
FIG. 11 is a diagram showing an example of a pixel arrangement pattern for four-viewpoints in first and second display regions of the display unit in which stereoscopic display is executed when a first observer observes the video display device in the Y-axis (+) direction and a second observer observes the video display device in the Y-axis (−) direction as shown in FIG. 10.

FIG. 11 is a diagram showing an example of a pixel arrangement pattern for four-viewpoints for the first and second display regions 61 and 62 of the display unit 13 in which stereoscopic display is performed when the first observer 51 observes the video display device 10 in the Y-axis (+) direction and the second observer 52 observes the video display device 10 in the Y-axis (−) direction as in FIG. 10. The basic configuration of the first display region 61 for the first observer 51 observing in the Y-axis (+) direction is the same as the configuration example shown in FIG. 6, and the basic configuration of the second display region 62 for the second observer 52 observing in the Y-axis (−) direction is the same as the configuration example shown in FIG. 8.

Note that the pixel arrangement pattern for four-viewpoints in the first display region 61 performing stereoscopic display is changed by the information on the position of the eyes of the first observer 51 obtained from the detection unit 12 and the information on the slit positions in the parallax barrier 11 between the first observer 51 and the display unit 13. The pixel arrangement pattern for four-viewpoints in the second display region 62 performing stereoscopic display is changed by the information on the position of the eyes of the second observer 52 obtained from the detection unit 12 and the information on the slit positions in the parallax barrier 11 between the second observer 52 and the display unit 13. In FIG. 11, the viewpoint number of the top-left pixel of the image corresponding to each observer is changed. However, the arrangement of the first-viewpoint pixel, the second-viewpoint pixel, the third-viewpoint pixel, and the fourth-viewpoint pixel from the left does not change. The arrangement of the pixels for the same viewpoints that are disposed diagonally downward left, does not change either. Note that the control unit 15 may determine an appropriate pixel arrangement pattern when the detection unit 12 detects a change in the observation direction of each observer. The control unit 15 may also change the pixel arrangement pattern in real time when the detection unit 12 detects a change in the relative positional relationship between each observer and the video display device 10 in which the viewpoint of each observer toward the display surface is changed in the horizontal direction or the like.

Figure 12:
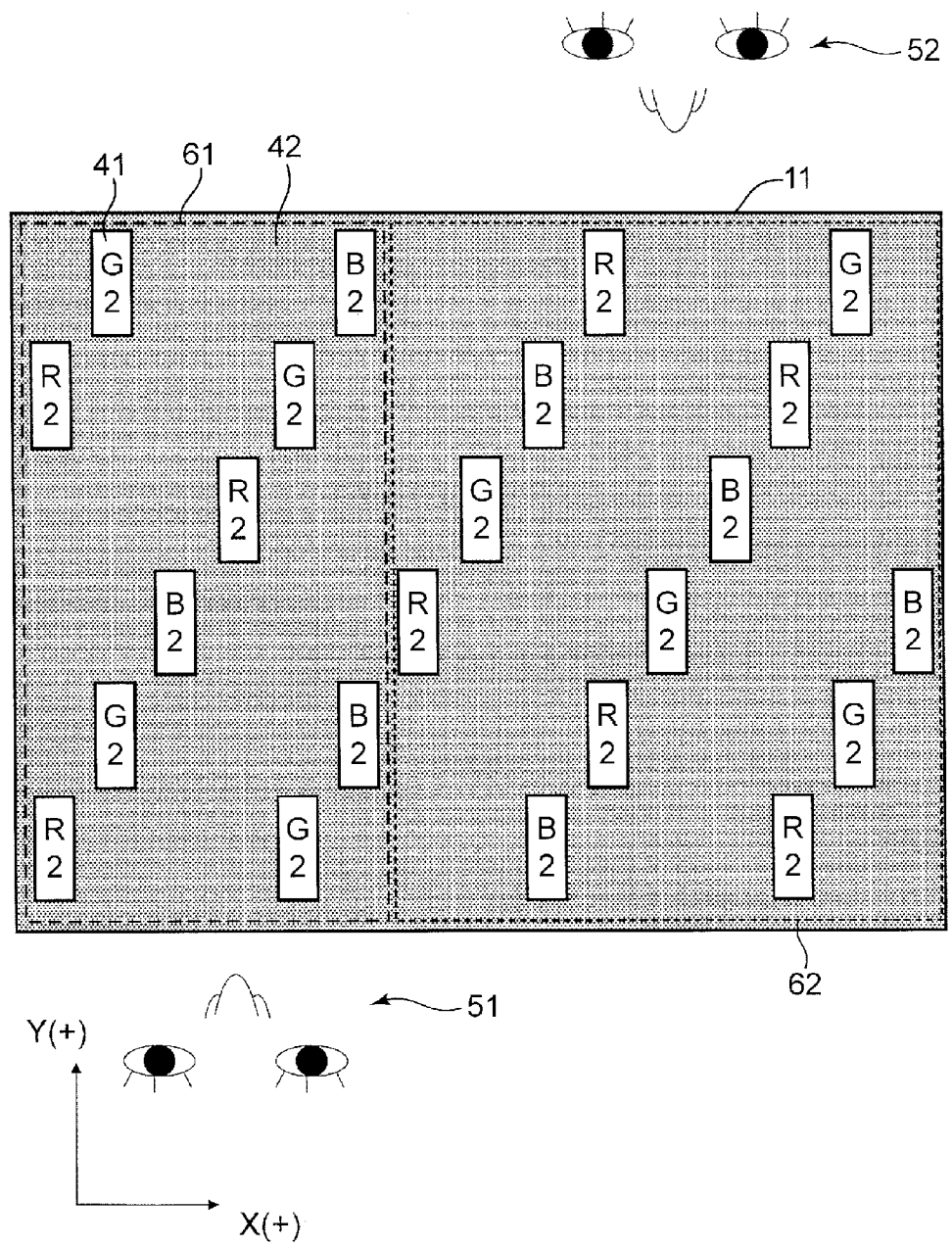
FIG. 12 is a diagram showing a barrier pattern of a parallax barrier corresponding to the pixel arrangement pattern shown in FIG. 11, in which the first observer observes the video display device in the Y-axis (+) direction and the second observer observes the video display device in the Y-axis (−) direction.

FIG. 12 is a diagram showing a barrier pattern of the parallax barrier that corresponds to the pixel arrangement pattern shown in FIG. 11, in which the first observer observes the video display device in the Y-axis (+) direction and the second observer observes the video display device in the Y-axis (−) direction.

Note that FIG. 12 shows a barrier pattern corresponding to the arrangement patterns of four-viewpoint pixels of the first and second display regions 61 and 62 of the display unit 13 in which stereoscopic display is executed, and shows a state in which only a group of second-viewpoint subpixels (R2, G2, B2) is observed by one of the eyes (e.g., the right eye) of the first observer 51 and/or the second observer 52 via the slit portions 41 of the parallax barrier 11. In the case where the observation position of each observer is moved in the horizontal direction (X-axis direction), there exist a position where only a group of first-viewpoint subpixels (R1, G1, B1) is observed via the slit portions 41, a position where only a group of third-viewpoint subpixels (R3, G3, B3) is observed, and a position where only a group of fourth-viewpoint subpixels (R4, G4, B4) is observed. A barrier pattern is created in such a manner that only a specific group of viewpoint subpixels is observed in an observation direction.

In this Embodiment 2, the first observer 51 and the second observer 52 observe the video display device 10 at the respective positions facing each other, but the present invention is not particularly limited to such a configuration; thus, the first observer 51 and the second observer 52 may observe the video display device 10 at positions, the observation directions from which form a predetermined angle. For example, the first observer 51 and the second observer 52 may observe the video display device 10 at positions, the observation directions of which form 90-degree angle. In other words, the first observer 51 may observe the video display device 10 in the Y-axis (+) direction, and the second observer 52 may observe the video display device 10 in the X-axis (−) direction.

In this case, the control unit 15 matches the base of the composite image with the reference base when the angle between the observation direction of the first observer 51 and the reference direction is 0 degrees. The control unit 15 also rotates the base of the composite image by 90 degrees from the reference side, in the case where the angle between the observation direction of the second observer 52 and the reference direction is 90 degrees. The control unit 15 may also change the positions of the slit portions 41 in the parallax barrier 11 in accordance with the composite images of the first display region 61 and the second display region 62.

Furthermore, in FIG. 10, the first display region 61 and the second display region 62 display the composite images different from each other, but the present invention is not limited to this configuration; thus, the first display region 61 and the second display region 62 may display the same composite image.

(Embodiment) 3

Figure 13:
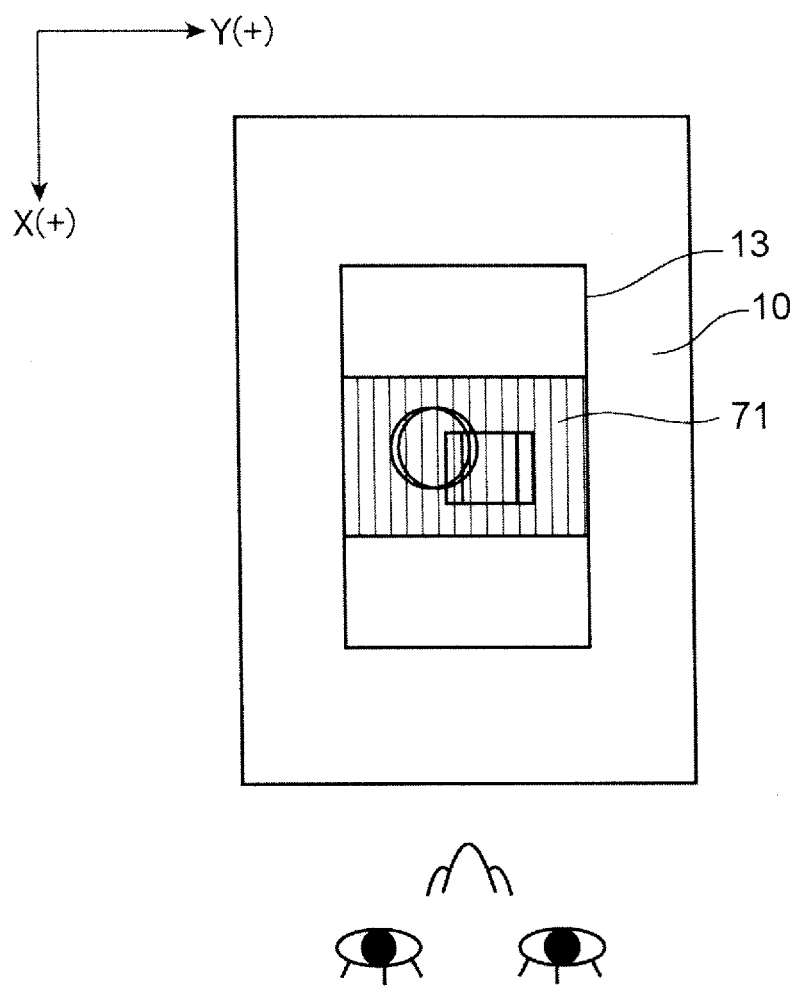
FIG. 13 is a diagram showing a display example of the display unit, in which the video display device shown in FIG. 3 is rotated 90 degrees clockwise within a plane parallel to a display surface.

FIG. 13 is a diagram showing a display example of the display unit, in which the video display device shown in FIG. 3 is rotated 90 degrees clockwise within a plane parallel to the display surface. In the case where the video display device 10 is rotated 90 degrees and 270 degrees clockwise within a plane parallel to the display surface, stereoscopic display is executed for an observer in a display region 71 within the display surface of the display unit 13, as with the example shown in FIG. 3. Using the information on the position of the eyes obtained from the detection unit 12 and the information on the positions of the slit portions 41 in the parallax barrier 11 between the observer and the display unit 13, the control unit 15 spatially divides a plurality of parallax images and combine them within the display region so as to allow the observer to stereoscopically observe the image correctly. The direction of the composite image that is displayed in the display region 71 of the display unit 13 in which stereoscopic display is executed, is controlled using the angle between an observation direction and the reference direction of the display unit in such a manner that the composite image in the display region 71 executing stereoscopic display faces the observer, the observation direction being obtained from the information on the position of the eyes of the observer obtained by the detection unit 12.

Figure 14:
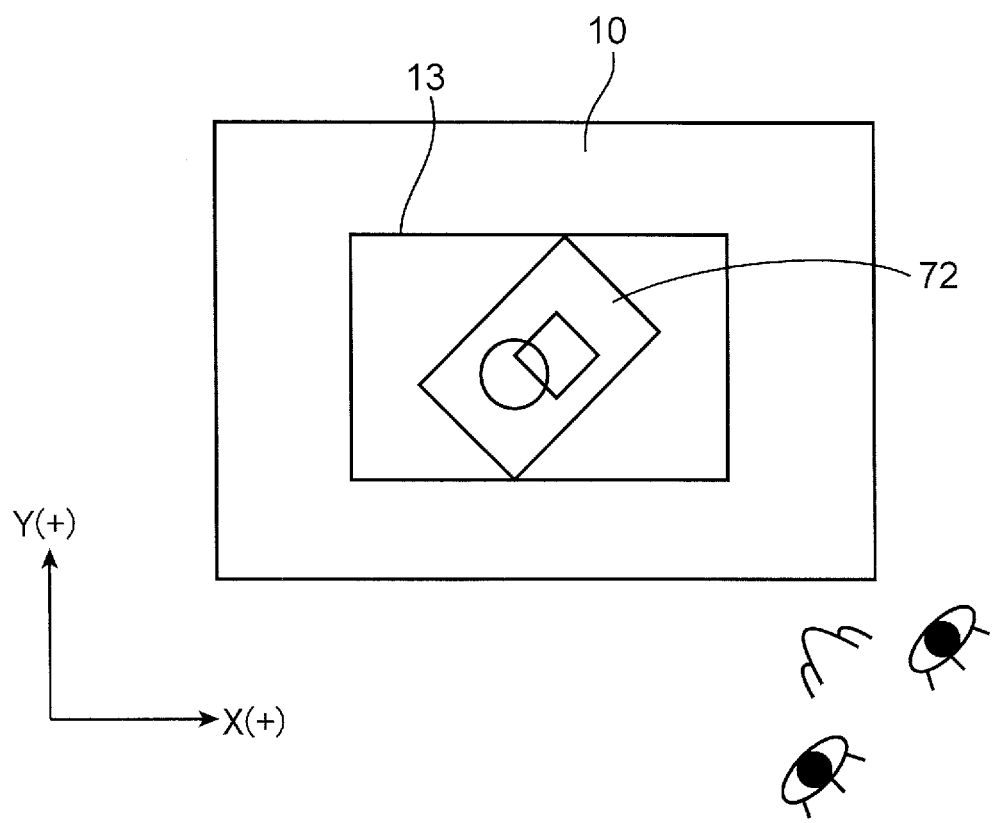
FIG. 14 is a diagram showing a display example of the display unit in which the video display image is rotated clockwise by an angle other than 90 degrees, 180 degrees, and 270 degrees within the plane parallel to the display surface.
Figure 16:
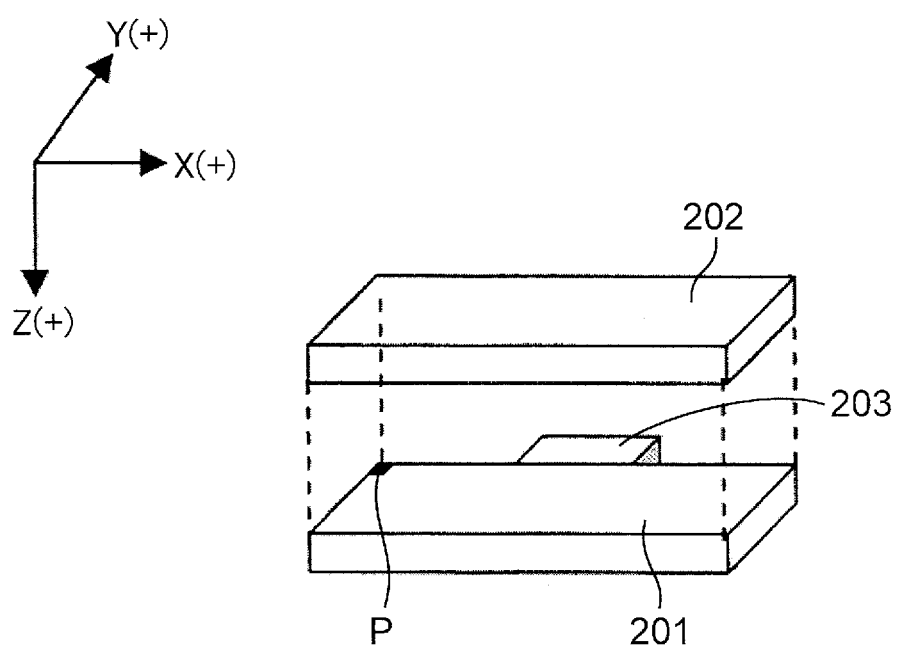
FIG. 16 is a diagram showing the schematic configuration of a conventional video display device.
Figure 17:
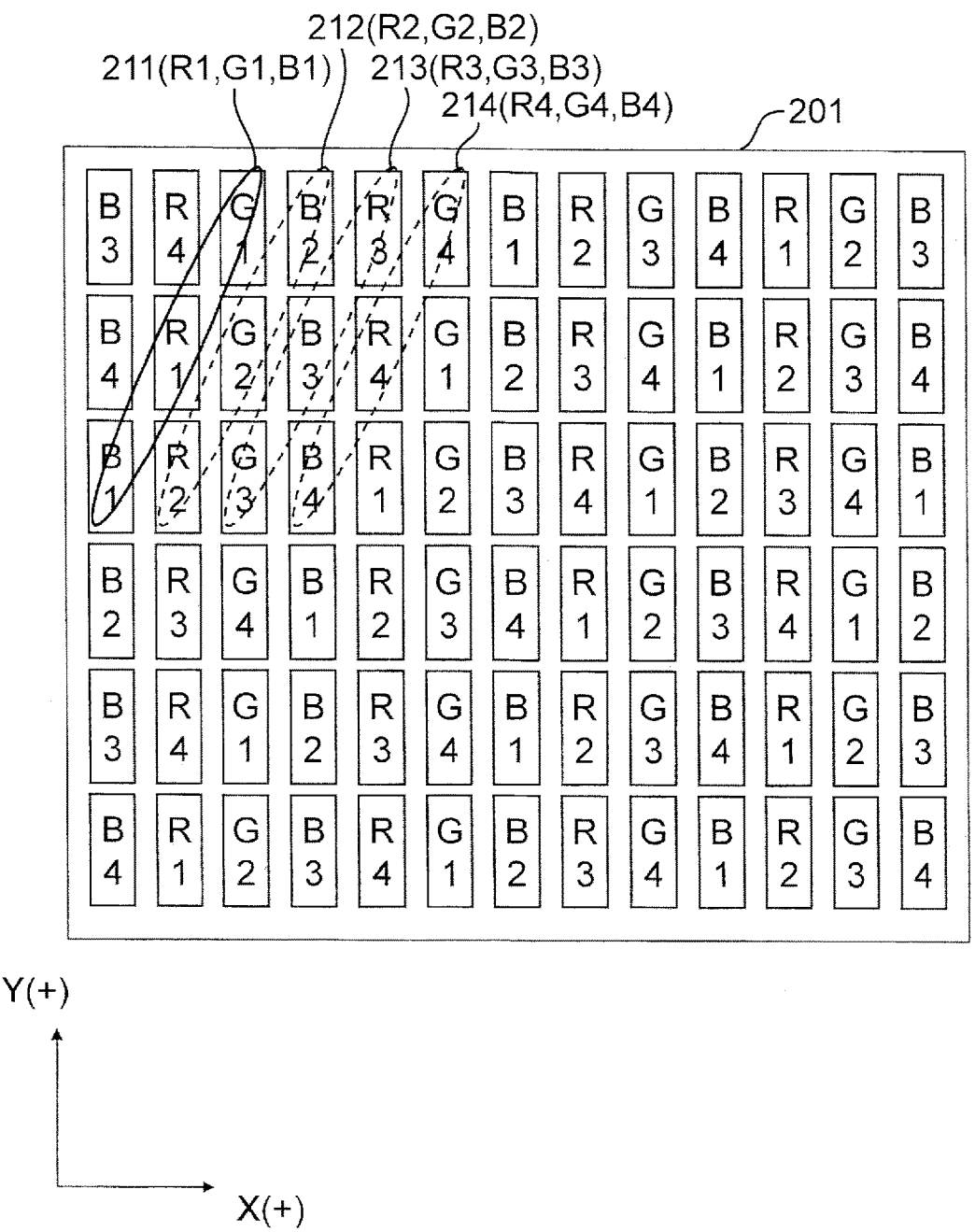
FIG. 17 is a diagram showing a pixel arrangement pattern for four-viewpoints, in which the display unit of the conventional video display device is in a first placement state.
Figure 18:
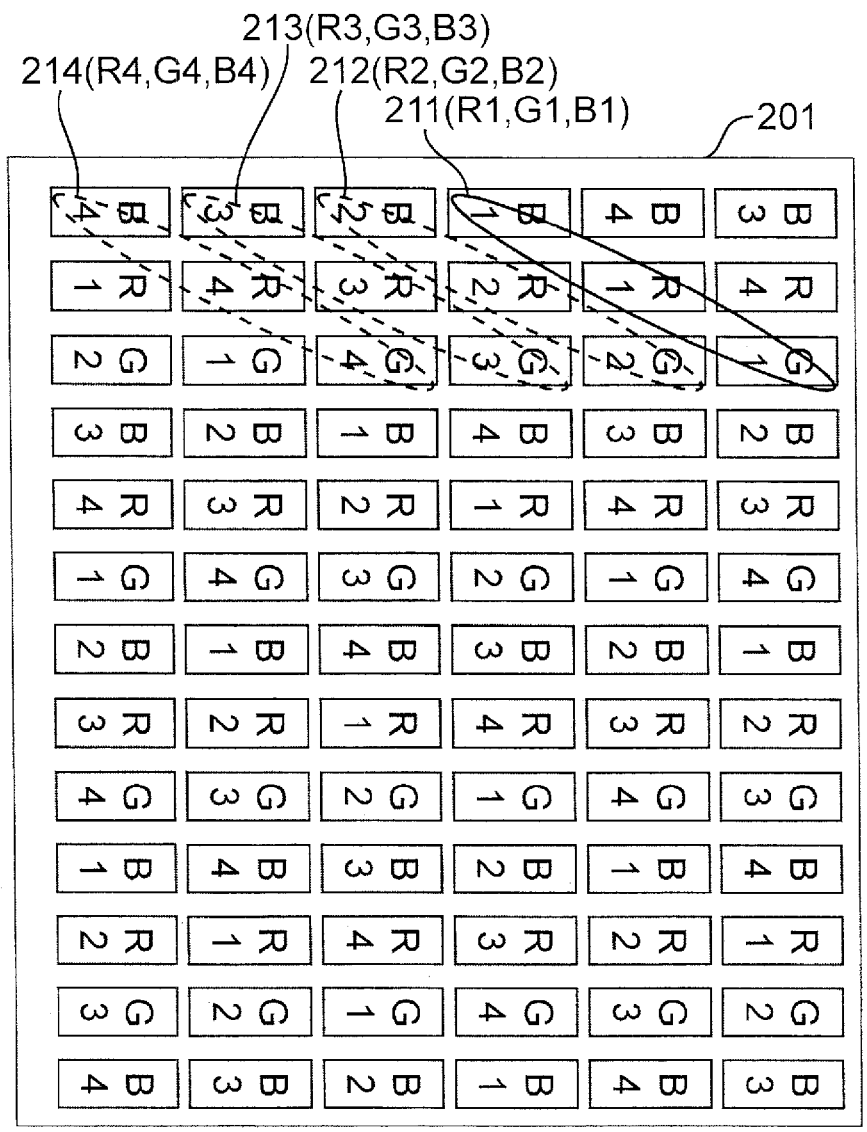
FIG. 18 is a diagram showing a pixel arrangement pattern for four-viewpoints, in which the display unit of the conventional video display device is in a second placement state obtained by rotating the display device 90 degrees from the first placement state.

In the case where the video display device 10 is rotated clockwise by an angle other than 90 degrees, 180 degrees, and 270 degrees within a plane parallel to the display surface, the display unit 13 may display a one-viewpoint image with no parallax at a position within a stereoscopic display region 72 to face the observer, as shown in FIG. 14.

FIG. 14 is a diagram showing a display example of the display unit, in which the video display device is rotated clockwise by an angle other than 90 degrees, 180 degrees, and 270 degrees within a plane parallel to the display surface.

In the case where the angle between the observation direction and the reference direction is an angle other than 0 degrees, 90 degrees, 180 degrees, and 270 degrees, the control unit 15 causes the display unit 13 to display only a first image or a second image. Specifically, in the case where the angle between the observation direction and the reference direction is an angle other than 0 degrees, 90 degrees, 180 degrees, and 270 degrees, the control unit 15 causes the display unit 13 to display only one image. As a result, the image is displayed two-dimensionally instead of stereoscopically in the display region 72 of the display unit 13. Note in FIG. 14 that the angle between the observation direction and the reference direction is 45 degrees.

In so doing, the control unit 15 may perform control for determining whether to form a barrier pattern in the entire parallax barrier 11 or not. Then, in the case where the angle between the observation direction and the reference direction is an angle other than 0 degrees, 90 degrees, 180 degrees, and 270 degrees, the control unit 15 may cause the parallax barrier 11 to transmit the entire video light from the display unit 13 without forming a barrier pattern in the entire parallax barrier 11.

This can provide a high-resolution image to the observer who observes the display unit from an angle at which stereoscopic display cannot be realized easily.

Moreover, in the case where the angle between the observation direction and the reference direction is an angle other than 0 degrees, 90 degrees, 180 degrees, and 270 degrees and where the parallax barrier 11 has a fixed barrier pattern, the control unit 15 may switch an image for a plurality of different viewpoints to an image for the same viewpoints and display only a one-viewpoint image.

Further, in the case where the angle between the observation direction and the reference direction is approximately 0 degrees, 90 degrees, 180 degrees, and 270 degrees, the image to be displayed in the display region executing stereoscopic display may be a single composite image obtained by combining a plurality of parallax images, as shown in FIG. 15.

FIG. 15 is a diagram showing a display example of the display unit, in which the video display device is rotated clockwise by approximately 90 degrees, 180 degrees, and 270 degrees within a plane parallel to the display surface.

In the case where the angle between the observation direction and the reference direction is within a first range of 0 degrees±20 degrees, a second range of 90 degrees±20 degrees, a third range of 180 degrees±20 degrees, and a fourth range of 270 degrees±20 degrees, the control unit 15 may cause the display unit 13 to display a composite image. In the case where the angle between the observation direction and the reference direction is outside the first range, the second range, the third range, and the fourth range, the control unit 15 may cause the display unit 13 to display only the first image or the second image. In such a case, the image is displayed stereoscopically in a display region 73 of the display unit 13 as long as the angle between the observation direction and the reference direction is within the range of 0 degrees±20 degrees, the range of 90 degrees±20 degrees, the range of 180 degrees±20 degrees, and the range of 270 degrees±20 degrees.

In other words, because stereoscopic vision of the image can be realized as long as the angle between the observation direction and the reference direction is within the range of 0 degrees±20 degrees, the range of 90 degrees±20 degrees, the range of 180 degrees±20 degrees, and the range of 270 degrees±20 degrees, it is not always necessary to stereoscopically display the image only when the angle between the observation direction and the reference direction is 0 degrees, 90 degrees, 180 degrees, and 270 degrees.

Therefore, even when the angle between the observation direction and the reference direction is slightly off 0 degrees, 90 degrees, 180 degrees, and 270 degrees, the observer can stereoscopically observe the image.

Note that in the case where the angle between the observation direction and the reference direction is outside the range of 0 degrees±20 degrees, the range of 90 degrees±20 degrees, the range of 180 degrees±20 degrees, and the range of 270 degrees±20 degrees, the control unit 15 may cause the display unit 13 to display only one image. In so doing, the control unit 15 may perform control for determining whether to form a barrier pattern in the entire parallax barrier 11 or not.

In addition, when the angle between the observation direction and the reference direction changes, the control unit 15 may optimize the slope of the barrier pattern in the parallax barrier 11 based on the slope of the subpixels. In other words, the control unit 15 changes the barrier pattern in accordance with the direction of the composite image that changes in response to a change in the angle between the observation direction and the reference direction.

For instance, the control unit 15 stores, beforehand, table data in which the angle between an observation direction and the reference direction is associated with the barrier pattern of the parallax barrier 11 that corresponds to the angle. Then, the control unit 15 specifies an observation direction based on the position of the eyes of an observer that are detected by the detection unit 12, and reads, from the table data, a barrier pattern corresponding to the specified angle between the observation direction and the reference direction. The control unit 15 then changes the barrier pattern of the parallax barrier 11 in accordance with the read barrier pattern. In this manner, stereoscopic display can be always realized in each display region regardless of the angle between the observation direction and the reference direction.

Note that Embodiments 1 to 3 each explained the parallax barrier as an example of the separation unit, but the present invention is not particularly limited to these embodiments. Therefore, a lenticular lens, a liquid crystal lens, or a prism may be used as the separation unit as well.

Also, according to Embodiments 1 to 3, the parallax barrier, which is an example of the separation unit, has only one barrier pattern formed therein and is disposed on the front surface of the display unit, but the present invention is not particularly limited to this configuration. The parallax barrier may be configured by a plurality of liquid crystals or a plurality of liquid crystal lenses, and the control unit 15 may control to transmit light or not to each of the liquid crystals or each of the liquid crystal lenses.

According to Embodiments 1 to 3, the parallax barrier, which is an example of the separation unit, is fixedly disposed on the front surface of the display unit, but the present invention is not particularly limited to this configuration. Therefore, the parallax barrier may mechanically be moved to the front or back.

Moreover, a fixed barrier that is created with a thin film or a substance with high transparency (glass, etc.) or a device capable of changing between a shielding state and an opening state (changing the light transmittance) with the application of voltages (e.g., a TFT (Thin Film Transistor) liquid crystal panel) may be used as the parallax barrier 11 described in each of Embodiments 1 to 3.

Embodiments 1 to 3 each described an example of the technique of disposing the parallax barrier (separation unit) 11 on the front surface of the display unit (display unit) 13; however, a technique of disposing the parallax barrier between a liquid crystal panel and a backlight of a liquid crystal display may be employed.

Moreover, the positions of the display regions according to Embodiments 1 to 3 in which stereoscopic display is executed are each determined using the coordinates of the upper left portion of each display region and the length and the width of the display region, with reference to the upper left end point (subpixel) of the display unit 13. Note that the subpixel located at the upper right, the lower left, the lower right, or the center of the display unit 13 may be used as a criterion for determining the position of each display region.

According to Embodiments 1 to 3, the control unit 15 controls the composite image displayed on the display unit 13, by using the information obtained from the detection unit 12 and the information on the slit positions in the parallax barrier 11. However, the control unit 15 may control the slit positions in the parallax barrier 11 by using the information obtained from the detection unit 12 and the composite image displayed in the display unit 13.

In addition, according to Embodiments 1 to 3, the barrier pattern of the parallax barrier 11 has the slit portions 41 arranged diagonally downward left from the upper right to the lower left. However, the slit portions 41 may be arranged diagonally downward right from the upper left to the lower right or in the perpendicular direction from the top to the bottom.

The barrier pattern of the parallax barrier 11 described in Embodiments 1 to 3 is a step-like barrier pattern in which the slit portions 41 are formed into steps. However, the barrier pattern of the parallax barrier 11 may be a barrier pattern other than the step-like barrier pattern, such as a slant-type barrier pattern in which the slit portions 41 are formed into diagonal stripes.

According to Embodiments 1 to 3, the width of each slit portion 41 of the parallax barrier 11 is equivalent to the width of each subpixel. However, the width of each slit portion 41 of the parallax barrier 11 may not be equivalent to the width of each subpixel.

According to Embodiments 1 to 3, the plurality of parallax images are different for each subpixel. However, the plurality of parallax images do not have to be different for each subpixel and may be different for, for example, every two subpixels, every three subpixels, or every four subpixels.

Embodiments 1 to 3 described an arrangement pattern of four-viewpoint pixels and a four-viewpoint barrier pattern; however, these patterns may be an arrangement pattern and barrier pattern of multi-viewpoint pixels such as two-viewpoint, three-viewpoint, or five-viewpoint pixels.

Moreover, Embodiment 2 described that a plurality of observers observe the same viewpoint, but the plurality of observers may observe different viewpoints.

Embodiment 2 also described that the plurality of observers observe the same number of viewpoints, but the plurality of observers do not have to observe the same number of viewpoints.

Embodiment 2 also described that the first display region 61 observed stereoscopically by the first observer 51 and the second display region 62 observed stereoscopically by the second observer 52 are adjacent to each other as shown in FIG. 10; however, these display regions observed stereoscopically by the observers do not have to be disposed adjacent to each other and therefore may be positioned anywhere on the display surface of the display unit 13.

Furthermore, according to Embodiment 2, there are two observers as shown in FIG. 10; however, there may be three or more observers.

According to Embodiment 2, as shown in FIG. 10, the two observers observe the image in such a manner as to face each other at, respectively, the position where the angle between the observation direction and the reference direction is 0 degrees and the position where the angle between the observation direction and the reference direction is 180 degrees. However, the angle formed by the observation direction of each of the plurality of observers and the reference direction can be at any degrees.

In addition, according to Embodiments 1 to 3, the detection unit 12 detects the position of the face of each viewer by using a CCD; however, the position of each viewer may be detected using a wireless technology such as bluetooth.

Note that the foregoing specific embodiments mainly include the inventions having the following configurations.

A display device according to one aspect of the present invention has: a display unit that includes a display surface emitting video light for displaying a composite image of a first image and a second image different from the first image; a separation unit that separates the video light into first video light representing the first image and second video light representing the second image; a detection unit that detects a position of an observer looking at the composite image; and an image control unit that controls a direction of the composite image in accordance with the position of the observer detected by the detection unit.

According to this configuration, the display unit includes a display surface emitting video light for displaying a composite image of a first image and a second image different from the first image. The separation unit separates the video light into first video light representing the first image and second video light representing the second image. The detection unit detects a position of an observer looking at the composite image. The image control unit controls a direction of the composite image in accordance with the position of the observer detected by the detection unit.

Therefore, controlling the direction of the composite image of the first image and the second image different from the first image in accordance with the detected position of the observer, allows the composite image to be displayed in accordance with the position of the observer.

In the foregoing display device, it is preferred that the composite image include a first image region and a second image region that is displayed between the first image region and the observer when the observer is present at a first position, and that, in the case where the presence of the observer at a second position different from the first position is detected by the detection unit, the image control unit control the direction of the composite image in such a manner that the second image region is displayed between the first image region and the observer present at the second position.

According to this configuration, the composite image includes a first image region and a second image region that is displayed between the first image region and the observer when the observer is present at a first position. In the case where the presence of the observer at a second position different from the first position is detected by the detection unit, the image control unit controls the direction of the composite image in such a manner that the second image region is displayed between the first image region and the observer present at the second position.

Therefore, the observer can observe the composite image in the right direction even after changing his/her position.

In the foregoing display device, it is preferred that the first image be a left image observed by the left eye, that the second image be a right image observed by the right eye, and that the separation unit separate the video light in such a manner as to input left video light representing the left image into the left eye and right video light representing the right image into the right eye.

According to this configuration, the first image is a left image observed by the left eye, and the second image a right image observed by the right eye. The separation unit separates the video light in such a manner as to input left video light representing the left image into the left eye and right video light representing the right image into the right eye. This allows the observer to observe a stereoscopic video.

Moreover, in the foregoing display device, it is preferred that the detection unit detect positions of a plurality of observers, and that the image control unit divide the display surface into a plurality of display regions in accordance with the number of the plurality of observers, and control the direction of the composite image in each of the plurality of display regions in accordance with the positions of the plurality of observers that are detected by the detection unit.

According to this configuration, the detection unit detects the positions of a plurality of observers. The image control unit divides the display surface into a plurality of display regions in accordance with the number of the plurality of observers, and controls the direction of the composite image in each of the plurality of display regions in accordance with the positions of the plurality of observers that are detected by the detection unit.

Therefore, controlling the direction of the composite image in each of the plurality of display regions can display the composite image for each observer in each display region when the plurality of observers look at the display device in different directions.

In the foregoing display device, it is preferred that the detection unit detect a position of the eyes of the observer, and that the image control unit specify an observation direction in which a direction extending from the position of the eyes of the observer, which is detected by the detection unit, toward the display surface is projected onto a plane including the display surface, and control a display position of the composite image in accordance with an angle between the specified observation direction and a predetermined reference direction.

According to this configuration, the detection unit detects the position of the eyes of the observer. The image control unit specifies an observation direction in which a direction extending from the position of the eyes of the observer, which is detected by the detection unit, toward the display surface is projected onto a plane including the display surface, and controls a display position of the composite image in accordance with an angle between the specified observation direction and a predetermined reference direction.

Thus, the display position of the composite image is controlled in accordance with the angle between the observation direction and the predetermined reference direction, the observation direction projecting, onto a plane including the display surface, the direction extending from the position of the eyes of the observer toward the display surface. Such a configuration can properly display the composite image in accordance with the direction of the observer facing the display surface of the display unit.

Moreover, in the foregoing display device, it is preferred that the separation unit have a barrier pattern that is configured by a slit portion for transmitting the video light from the display unit and a shielding portion for shielding the video light, and that the display device further comprise a barrier pattern control unit that changes the barrier pattern in accordance with the direction of the composite image that changes in response to a change in the angle between the observation direction and the reference direction.

According to this configuration, the separation unit has a barrier pattern that is configured by a slit portion for transmitting the video light from the display unit and a shielding portion for shielding the video light. The barrier pattern control unit changes the barrier pattern in accordance with the direction of the composite image that changes in response to a change in the angle between the observation direction and the reference direction.

Because the barrier pattern is changed in accordance with the direction of the composite image which changes in response to a change in the angle of the observation direction and the reference direction, the observer can reliably view the composite image stereoscopically even when the direction in which the observation observes is changed.

In the foregoing display device, it is preferred that the reference direction be a direction perpendicular to a reference side out of a plurality of sides of the display surface, and that the image control unit match a base of the composite image with the reference side in the case where the angle between the observation direction and the reference direction is 0 degrees, and rotate the base of the composite image by a predetermined angle from the reference side in the case where the angle between the observation direction and the reference direction is the predetermined angle.

According to this configuration, the reference direction is a direction perpendicular to a reference side out of a plurality of sides of the display surface. The image control unit matches the base of the composite image with the reference side in the case where the angle between the observation direction and the reference direction is 0 degrees, and rotates the base of the composite image by a predetermined angle from the reference side in the case where the angle between the observation direction and the reference direction is the predetermined angle.

Therefore, the composite image can be displayed in such a manner that the base of the composite image is matched with the reference side when the angle between the observation direction and the reference direction is 0 degrees and that the base of the composite image is rotated by a predetermined angle from the reference side when the angle between the observation direction and the reference direction is the predetermined angle. This configuration can properly display the composite image in accordance with the direction of the observer facing the display surface of the display unit.

Furthermore, in the foregoing display device, it is preferred that the predetermined angle be 90 degrees, 180 degrees, or 270 degrees.

According to this configuration, the image control unit matches the base of the composite image with the reference side in the case where the angle between the observation direction and the reference direction is 0 degrees, rotates the base of the composite image by 90 degrees from the reference side in the case where the angle between the observation direction and the reference direction is 90 degrees, rotates the base of the composite image by 180 degrees from the reference side in the case where the angle between the observation direction and the reference direction is 180 degrees, and rotates the base of the composite image by 270 degrees from the reference side in the case where the angle between the observation direction and the reference direction is 270 degrees.

Therefore, in the case where the angle between the observation direction and the reference direction is 0 degrees, 90 degrees, 180 degrees, and 270 degrees, the composite image can be displayed properly in accordance with the direction of the observer with respect to the display surface of the display unit.

In the foregoing display device, it is preferred that the image control unit cause the display unit to display only the first image or the second image in the case where the angle between the observation direction and the reference direction is an angle other than 0 degrees, 90 degrees, 180 degrees, and 270 degrees.

According to this configuration, the image control unit causes the display unit to display only the first image or the second image in the case where the angle between the observation direction and the reference direction is an angle other than 0 degrees, 90 degrees, 180 degrees, and 270 degrees. Therefore, in the case where the angle between the observation direction and the reference direction is an angle other than 0 degrees, 90 degrees, 180 degrees, and 270 degrees, the video can be displayed two-dimensionally instead of stereoscopically.

In the foregoing display device, it is preferred that the separation unit have a barrier pattern that is configured by a slit portion for transmitting the video light from the display unit and a shielding portion for shielding the video light, and that the display device further comprise a barrier pattern control unit that transmits the entire video light without forming the barrier pattern on the entire surface of the separation unit, in the case where the angle between the observation direction and the reference direction is an angle other than 0 degrees, 90 degrees, 180 degrees, and 270 degrees.

According to this configuration, the separation unit has a barrier pattern that is configured by a slit portion for transmitting the video light from the display unit and a shielding portion for shielding the video light. The barrier pattern control unit transmits the entire video light without forming the barrier pattern on the entire surface of the separation unit, in the case where the angle between the observation direction and the reference direction is an angle other than 0 degrees, 90 degrees, 180 degrees, and 270 degrees.

Because the entire video light can be transmitted without having the barrier pattern on the entire surface of the separation unit in the case where the angle between the observation direction and the reference direction is an angle other than 0 degrees, 90 degrees, 180 degrees, and 270 degrees, a two-dimensional video of a higher resolution can be displayed.

In the foregoing display device, it is preferred that the reference direction be a direction perpendicular to a reference side out of a plurality of sides of the display surface, and that the image control unit cause the display unit to display the composite image in the case where the angle between the observation direction and the reference direction is within a first range of 0 degrees±20 degrees, a second range of 90 degrees±20 degrees, a third range of 180 degrees±20 degrees, and a fourth range of 270 degrees±20 degrees, and cause the display unit to display only the first image or the second image in the case where the angle between the observation direction and the reference direction is outside the first range, the second range, the third range, and the fourth range.

According to this configuration, the reference direction is a direction perpendicular to a reference side out of a plurality of sides of the display surface. The image control unit causes the display unit to display the composite image in the case where the angle between the observation direction and the reference direction is within a first range of 0 degrees±20 degrees, a second range of 90 degrees±20 degrees, a third range of 180 degrees±20 degrees, and a fourth range of 270 degrees±20 degrees, and causes the display unit to display only the first image or the second image in the case where the angle between the observation direction and the reference direction is outside the first range, the second range, the third range, and the fourth range.

Therefore, even when the angle between the observation direction and the reference direction is slightly off 0 degrees, 90 degrees, 180 degrees, and 270 degrees, the observer can stereoscopically observe the video as long as the angular difference is limited to a predetermined level.

In the foregoing display device, it is preferred that the detection unit detect a position of the eyes of the observer, and that the image control unit specify a direction extending from the position of the eyes of the observer, which is detected by the detection unit, toward the display surface, and control a display position of the composite image in accordance with information on the position of the eyes of the observer in the specified direction and information on a position of the separation unit.

According to this configuration, the detection unit detects the position of the eyes of the observer. The image control unit specifies the direction extending from the position of the eyes of the observer, which is detected by the detection unit, toward the display surface, and controls a display position of the composite image in accordance with the information on the position of the eyes of the observer in the specified direction and the information on the position of the separation unit.

This can change the display position of the composite image in response to a change in the position of the observer in the perpendicular direction.

The specific embodiments or examples provided herein for implementing the present invention are strictly to clarify the technical details of the present invention, and should not be construed as limiting the present invention to such specific examples. The present invention can be changed in various ways without departing from the spirit of the present invention and the scope of the appended claims.

INDUSTRIAL APPLICABILITY

The display device according to the present invention is capable of displaying a composite image in accordance with the position of an observer and is useful as a display device for stereoscopically displaying information in the field of televisions, computers, digital signage, game machines, medical equipment and the like. The display device according to the present invention is particularly useful as a mobile tablet, a table display device, and the like.

The invention claimed is:

1. A display device, comprising:
   a display unit that includes a display surface emitting video light for displaying a composite image of a first image and a second image different from the first image;
   a separation unit that separates the video light into first video light representing the first image and second video light representing the second image;
   a detection unit that detects a position of an observer looking at the composite image; and
   an image control unit that controls a direction of the composite image in accordance with the position of the observer detected by the detection unit, wherein
   the detection unit detects a position of the eyes of the observer,
   the image control unit specifies an observation direction in which a direction extending from the position of the eyes of the observer, which is detected by the detection unit, toward the display surface is projected onto a plane including the display surface,
   causes the display unit, in a case where an angle between the specified observation direction and a reference direction, which is a direction perpendicular to a reference side of the display surface, is zero degrees, to display the composite image at a position where a base of the composite image matches the reference side, and, in a case where the angle between the observation direction and the reference direction is within a first range of zero degrees ±20 degrees excluding zero degrees, a second range of 90 degrees ±20 degrees, a third range of 180 degrees ±20 degrees, or a fourth range of 270 degrees ±20 degrees, to display the composite image at a position where the base of the composite image is rotated by an angle between the observation direction and the reference direction from the reference side, and
   causes the display unit to display only one of the first image or second image at a position where the base of the one of the first image or second image is rotated by an angle between the observation direction and the reference direction from the reference side in a case where the angle between the observation direction and the reference direction is outside the first range, the second range, the third range, and the fourth range, and
   the separation unit has a barrier pattern that is configured by a slit portion for transmitting the video light from the display unit and a shielding portion for shielding the video light, the display device further comprising:
   a barrier pattern control unit that transmits the entire video light from the display unit without forming the barrier pattern on an entire surface of the separation unit in the case where the angle between the observation direction and the reference direction is outside the first range, the second range, the third range, and the fourth range.

2. The display device according to claim 1, wherein
   the composite image includes a first image region and a second image region that is displayed between the first image region and the observer when the observer is present at a first position, and
   in the case where the presence of the observer at a second position different from the first position is detected by the detection unit, the image control unit controls the direction of the composite image in such a manner that the second image region is displayed between the first image region and the observer present at the second position.

3. The display device according to claim 1, wherein
   the first image is a left image observed by the left eye,
   the second image is a right image observed by the right eye, and
   the separation unit separates the video light in such a manner as to input left video light representing the left image into the left eye and right video light representing the right image into the right eye.

4. The display device according to claim 1, wherein
the detection unit detects positions of a plurality of observers, and
the image control unit divides the display surface into a plurality of display regions in accordance with the number of the plurality of observers, and controls the direction of the composite image in each of the plurality of display regions in accordance with the positions of the plurality of observers that are detected by the detection unit.

5. The display device according to claim 1, wherein
the barrier pattern control unit changes the barrier pattern in accordance with a direction of the composite image that changes in response to a change in the angle between the observation direction and the reference direction in the case where the angle between the observation direction and the reference direction is within the first range, the second range, the third range, or the fourth range.

6. The display device according to claim 1, wherein
the detection unit detects a position of the eyes of the observer, and
the image control unit specifies a direction extending from the position of the eyes of the observer, which is detected by the detection unit, toward the display surface, and controls a display position of the composite image in accordance with information on the position of the eyes of the observer in the specified direction and information on a position of the separation unit.

* * * * *